United States Patent
Saha

(10) Patent No.: US 12,450,011 B2
(45) Date of Patent: Oct. 21, 2025

(54) FLEXIBLE WRITE CACHE POLICY IN RAID ENVIRONMENTS

(71) Applicant: Avago Technologies International Sales Pte. Limited, Singapore (SG)

(72) Inventor: Sourav Saha, Bengaluru (IN)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 18/507,005

(22) Filed: Nov. 10, 2023

(65) Prior Publication Data

US 2025/0156111 A1 May 15, 2025

(51) Int. Cl.
*G06F 3/06* (2006.01)

(52) U.S. Cl.
CPC .......... *G06F 3/0659* (2013.01); *G06F 3/0604* (2013.01); *G06F 3/0664* (2013.01); *G06F 3/0689* (2013.01)

(58) Field of Classification Search
CPC .... G06F 3/0659; G06F 3/0604; G06F 3/0664; G06F 3/0689
USPC ................................. 711/118, 154
See application file for complete search history.

(56) References Cited

U.S. PATENT DOCUMENTS

| | | | |
|---|---|---|---|
| 10,452,548 B2 | 10/2019 | Roberts et al. | |
| 2014/0195732 A1* | 7/2014 | T. .................. | G06F 12/0871 711/113 |
| 2015/0286438 A1 | 10/2015 | Simionescu et al. | |
| 2015/0378921 A1* | 12/2015 | Karippara .......... | G06F 9/45533 710/308 |
| 2020/0057576 A1* | 2/2020 | Simionescu ........ | G06F 3/0655 |
| 2021/0132840 A1* | 5/2021 | Tylik ................. | G06F 3/0644 |
| 2024/0329848 A1* | 10/2024 | Roy ................... | G06F 3/067 |

OTHER PUBLICATIONS

Extended European Search Report, European Application No. 24211144.1 dated Apr. 7, 2025, 7 pages.

* cited by examiner

*Primary Examiner* — Than Nguyen
(74) *Attorney, Agent, or Firm* — King Intellectual Asset Management

(57) ABSTRACT

Solutions for providing more customizable performance for a virtual disk in a RAID environment. Some solutions provide for a flexible write cache policy that manages a proportion of input-output operations written in write-back mode against input-output operations written in write-though mode. In some cases, aspects of the flexible write cache policy can be specified by a user.

20 Claims, 14 Drawing Sheets

FLEXIBLE WRITE CACHE POLICY IN RAID ENVIRONMENTS

TECHNICAL FIELD

This disclosure relates generally to RAID storage systems and more particularly to solutions for managing virtual disks in a RAID environment.

BACKGROUND

A redundant array of independent disks (RAID) storage system can logically consolidate multiple physical disks into one or more consolidated pools of storage resources. In many cases, a RAID controller will handle the management of these resources and will allocate the resources into one or more virtual disks (also known as logical devices), each of which appears to the host (e.g., a computer operating system in communication with the controller) to be a single physical disk.

Each virtual disk generally is subject to one of two write cache policies: a write-back policy and a write-through policy. In either case, the controller receives from the host data to be written in a transaction. The transaction generally will be implemented in a number of input-output operations (IO) performed by the RAID controller. Under a write-back policy, the RAID controller sends a data transfer completion signal to the host when controller has performed the necessary IOs to store the data from the transaction in the controller's cache. By contrast, under a write-though policy, the controller does not send a completion signal to the host until the transaction is actually written (e.g., with drive IOs) to the physical media of the virtual drives on which it will be stored. The data rate provided to the host is higher under a write-back policy because the cache generally is implemented in random access memory (e.g., dynamic random-access data (DRAM) or its variants) which provides significantly faster IO transfer rates than the physical drives, which might be solid state drives (SSD), hard disk drives (HDD), etc. The DRAM provides low latency and high throughput for write-intensive applications. In some cases, the write-back policy will result in performance gains of up to 50% in host transactions due to the performance advantages of DRAM.

Other than issues of reliability, however, the use of a write-back policy comes at a cost, which is the performance of all other virtual disks that use the same physical media as the virtual disk with the write-back policy. If the controller's cache is dominated by a first virtual disk's write-back policy, it cannot be used (or its use is limited) to serve other virtual disks.

Current solutions generally require the end user (e.g., the company operating the virtual disk) to configure the virtual disk using either a write-back policy or a write-through policy. Current solutions cannot support both policies at the same time. This can present an all-or-nothing dilemma to the end user. The application for the virtual disk might require better performance than a write-through policy can provide but not the full performance of a write-back policy. In such a case, the end user will have to select a write-through policy and suffer some performance loss for that application or select a write-back policy in the knowledge that the particular application might not take advantage of the full performance of that policy, while the policy might hurt the performance of other, competing, applications and/or virtual disks.

Thus, there is a need for a more flexible write cache policy for RAID virtual disks.

DETAILED DESCRIPTION

Figure 1A:
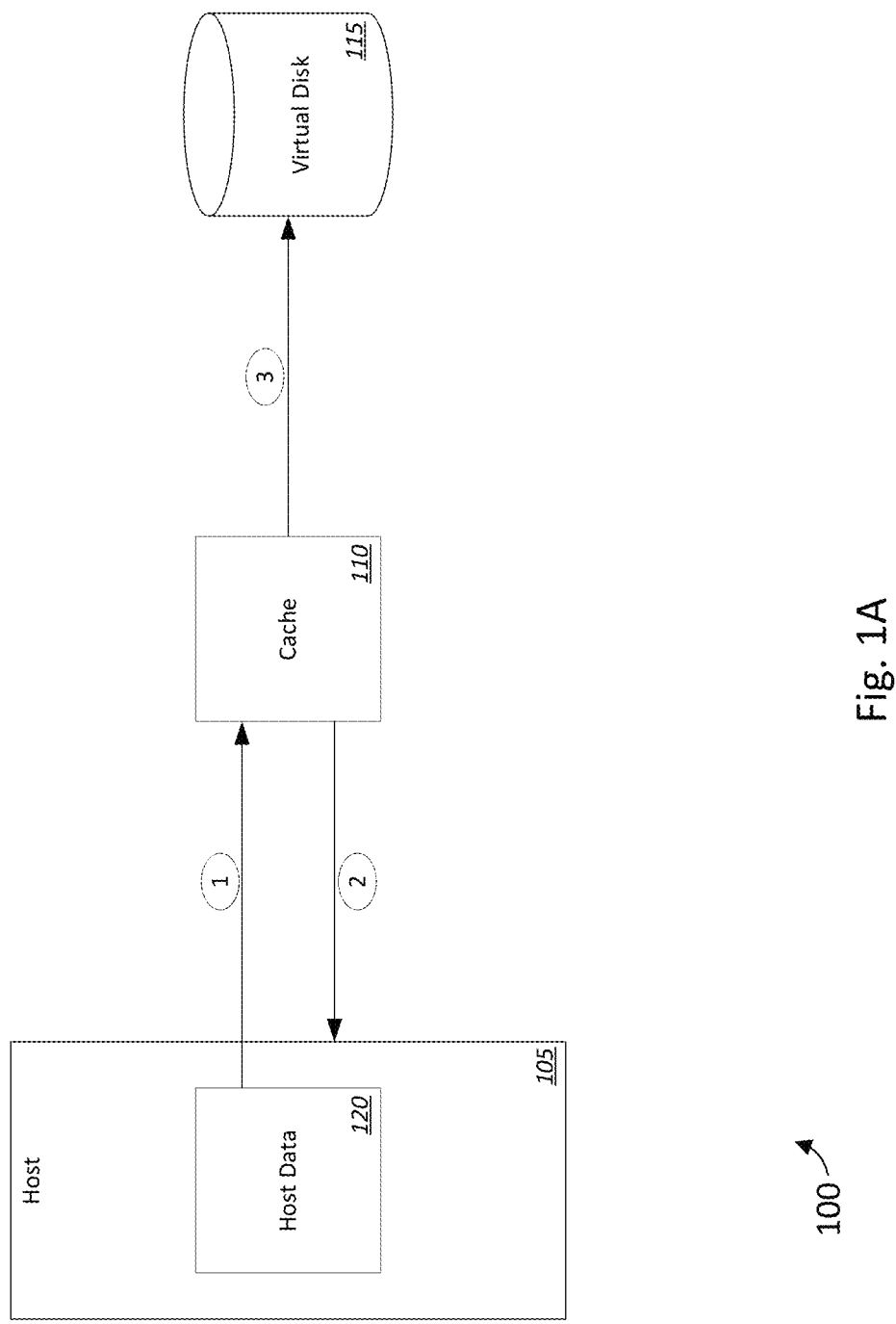
FIG. 1A illustrates a virtual disk operating in a write-back mode in accordance with various embodiments.

As noted above, a typical RAID controller offers the end user the option to configure a virtual disk either in a write-back mode or a write-though mode depending on the user's requirements. Thus, a virtual disk can be understood to be either a "write-back" volume or a "write-though" volume. As used herein, the term "write-back" means a mode or technique in which the RAID controller writes IOs to a cache and provides confirmation that the IOs are complete before the IOs are written to the virtual disk. An example of a write-back technique is illustrated by FIG. 1, which generally illustrates a system 100 with a host 105, a cache 110, and a virtual disk 115. The host 105 submits data 120 to be written to the virtual disk 115. In a write-back mode, data 120 is written to the cache 110 (operation 1), and the cache 110 responds to the host immediately after the data 120 is written to the cash (operation 2). The data 120 is later flushed to the virtual disk 115 (operation 3). Thus, the write-back mode provides confirmation to the host 105 before the data 120 is actually written to the virtual disk 115. The data rate is faster than in write-through mode since the cache often is stored in DRAM and therefore provides much faster IO operations than the physical disks of the virtual disk. Write-back mode therefore has low latency and high throughput for write-intensive applications.

Figure 1B:
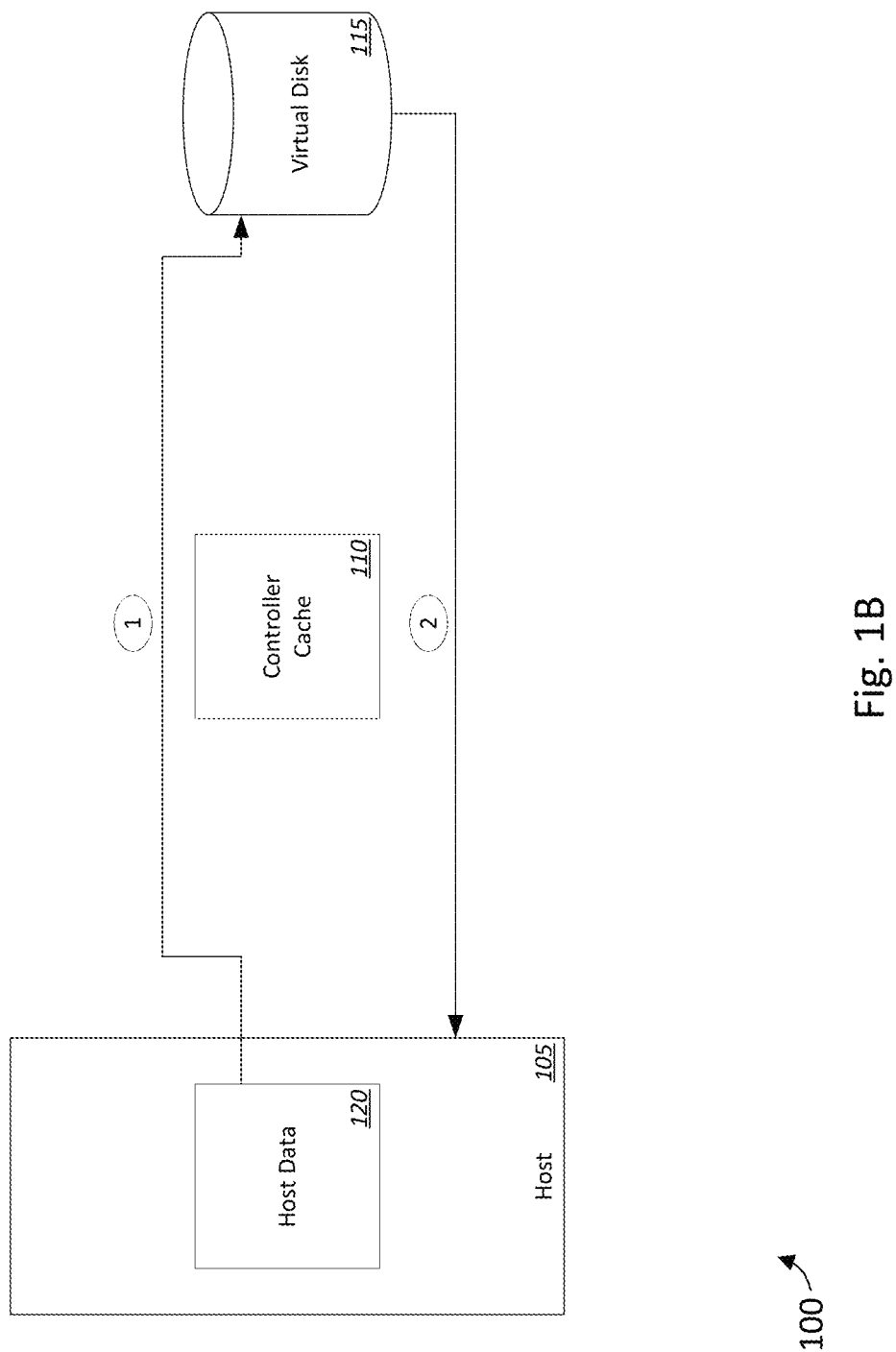
FIGS. 1B and 1C illustrate a virtual disk operating in a write-through mode in accordance with various embodiments.
Figure 1C:
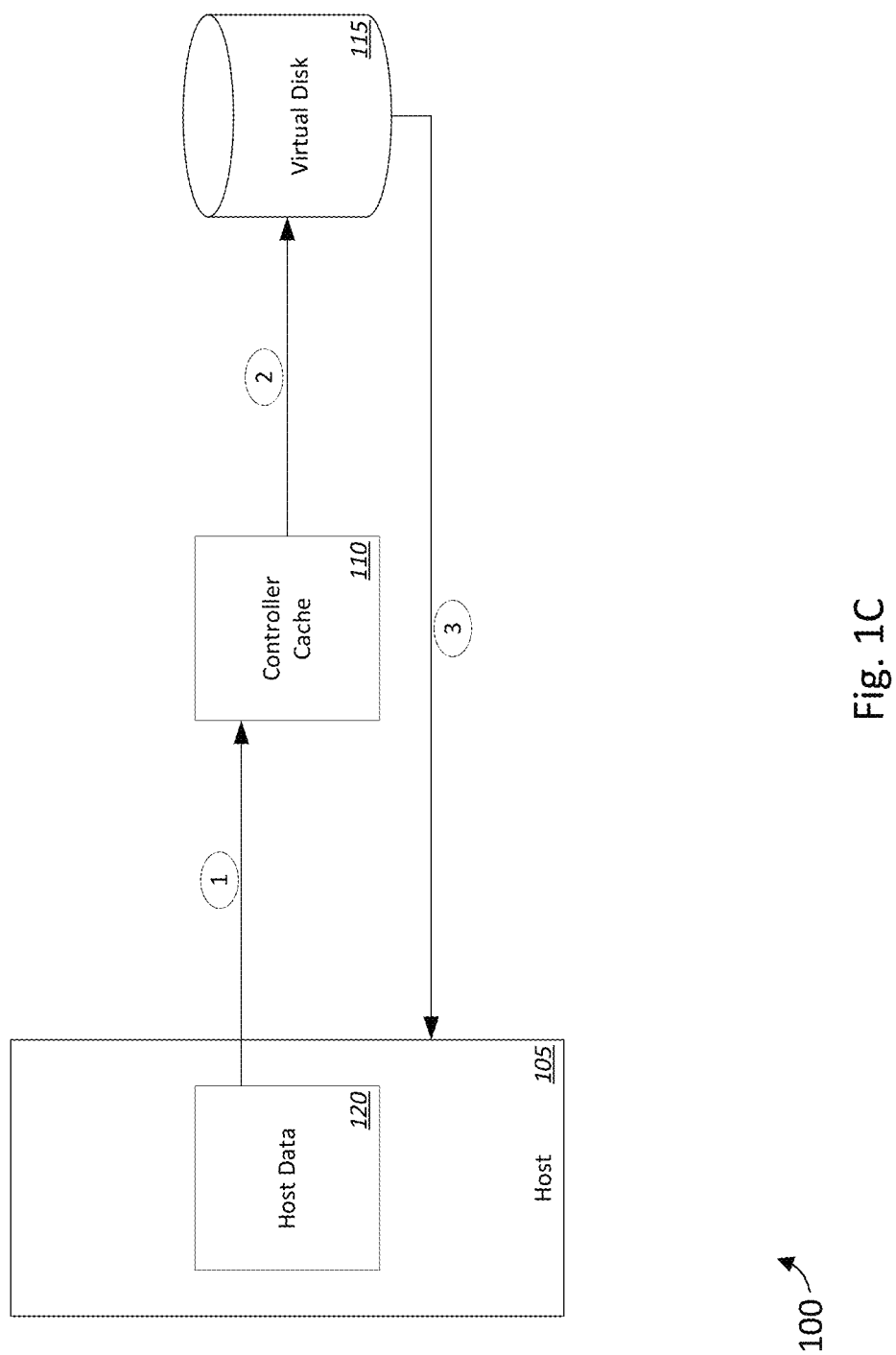

Conversely, the term "write-through" means a mode or technique in which the RAID controller does not provide confirmation that the IOs have been completed until after the IOs have been written to the virtual disk. An example of the write-through technique is illustrated by FIG. 1B. In FIG. 1B, the system has the same host 105, cache 110, and virtual disk 115. In this case, however, which the host 105 submits data 120 to be written, the data 120 bypasses the cache 110 and is written directly to the virtual disk 115 (operation 1). The host is provided confirmation (operation 2) only after the IOs to write the data 120 have been executed on the virtual disk 115. FIG. 1C illustrates a slightly different implementation of write-through mode in a virtual disk 115 that employs parity (as required by some RAID levels). In the arrangement of FIG. 1C, the data 120 might be written to the cache (operation 1) but only for the purposes of calculating parity. The data 120 and the parity information are then flushed to the virtual disk 115 (operation 2). Importantly, however, in write-through mode, the controller does not provide confirmation (operation 3) until after the data (IOs) are written to the virtual disk itself; this is substantially equal in terms of the effect on drive performance and cache bandwidth to the non-parity write-through arrangement of FIG. 1B.

In other words, any caching that might occur for parity purposes does not affect the performance of the write-through disk, which is gauged by the speed of the IO confirmations, which (identical to those of the write-through mode of FIG. 1B), do not occur until after the data 120 has been written to the virtual disk 115. In both the parity and non-parity configurations, write-through mode performance is slower than write-back mode, because the physical disks of the virtual disk are higher latency than the cache in DRAM, thus providing higher latency in returning IO confirmations and resulting in a slower write data rate. As such, all IOs that are performed in write-though mode are described herein as having been "written directly to the virtual disk," regardless of any caching for parity purposes, because that use of the cache does not substantially alter the timing of the write confirmation; one skilled in the art therefore should appreciate that the term "written directly to the virtual disk" includes embodiments in which data might be briefly cached for parity purposes before being actually written to the virtual disk.

Thus, while write-back mode and write-through mode both provide the host with confirmation that the IO has been executed. Because, however, the operation of writing to a cache takes much less time than writing to the virtual disk, a write-back volume generally provides performance at least 50% higher than a write-through volume, in terms of the amount of time the host perceives between submitting the IO and receiving confirmation that it has been executed. Virtual disks that require faster data writes are configured as write-back, while in situations in which performance requirements can be satisfied served with slower data writes, virtual disks are often configured as write-through.

This arrangement offers little granularity or precision. Under this arrangement, a virtual disk is either a write-back disk or a write-through disk. In some situations, however, a user might require a virtual disk with a higher data rate than a write-though disk, but not as high as a write-back disk. If the user were to configure the virtual disk as write-back, then this configuration would consume more caching bandwidth than necessary to meet the user's requirements and might adversely affect the performance of other dedicated write-back drives. If the user were to configure the disk as write-through, however, it would not satisfy the user's performance requirements.

Figure 1D:
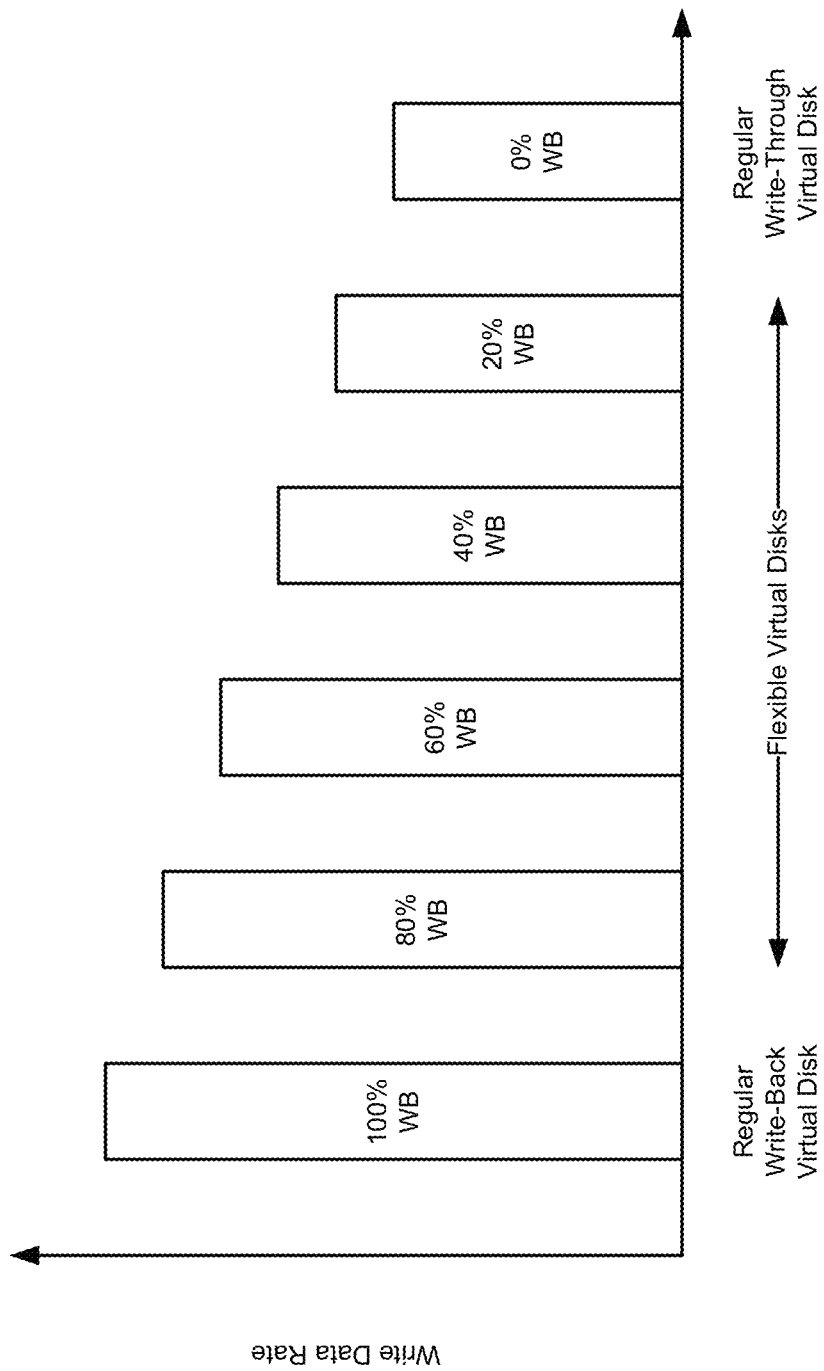
FIG. 1D illustrates relative performance of different flexible write cache policies in accordance with various embodiments.

Some embodiments provide a solution to this dilemma by providing a flexible write cache policy that can allow a user to configure a virtual disk with a specified proportion of write-back operations, such that a virtual disk could be, e.g., 20% write-back and 80% write-through, such that where only 20% of the IOs will be cached and the others will all be written directly to disk. As used herein, the term "flexible write cache policy" means any configuration or technique by which a virtual disk can employ IO caching selectively (i.e., neither 100% write-back IOs nor 100% wright-through IOs). As described in further detail below, in some embodiments, a flexible write cache policy can provide a user with the option to determine the proportion of total IOs that are performed in a write back mode and/or a write-through mode. FIG. 1D provides a simplified illustration of the relative performance of different write-back proportions. While typical systems provide the choice of either full write-through (0% write-back) or full write-back (100% write-back), embodiments can allow a user to choose a flexible write cache policy that can balance the user's performance requirements against conservation of controller resources. As the example of FIG. 1D shows, a user might be able to choose a write-back proportion of ⅕ (20%), ⅖ (40%), ⅗ (60%), ⅘ (80%), each of which has a corresponding performance level. (While FIG. 1D and other examples herein might use multiples of ⅕ for the sake of simplicity, the skilled artisan should recognize that embodiments are not so limited, and that different implementations can use any number of different write-back proportions with whatever level of granularity is desired.)

In some embodiments, configuration can be performed by the user, e.g., at a command line. A typical command to create a write-through virtual disk might be createVD    size=xxx    stripSize=xxx    raidType=xxx wrcache=WT In some embodiments, that command might be expressed as createVD    size=xxx    stripSize=xxx    raidType=xxx wrcache=0

In these embodiments, the parameter wrcache=0 might a write-back proportion of 0 (full write-through). Similarly, while a typical command to create a write-back disk might be createVD    size=xxx    stripSize=xxx    raidType=xxx wrcache=WB some embodiments might employ a command such as createVD    size=xxx    stripSize=xxx    raidType=xxx wrcache=100

In these embodiments, the parameter wrcache=100 might specify a write-back proportion of 100% (full write-back). This command format allows for flexibility in specifying the write-back proportion for a new virtual disk:

createVD    size=xxx    stripSize=xxx    raidType=xxx wrcache=X

In these embodiments, X can represent the write-back proportion (e.g., as a percentage). It should be appreciated, of course, that in these examples, and throughout this document, all references to write-back proportion could equally be expressed as a write-through proportion (which, in this exemplary formulation, would be the write-through proportion subtracted from 1.0 or 100%).

Figure 2A:
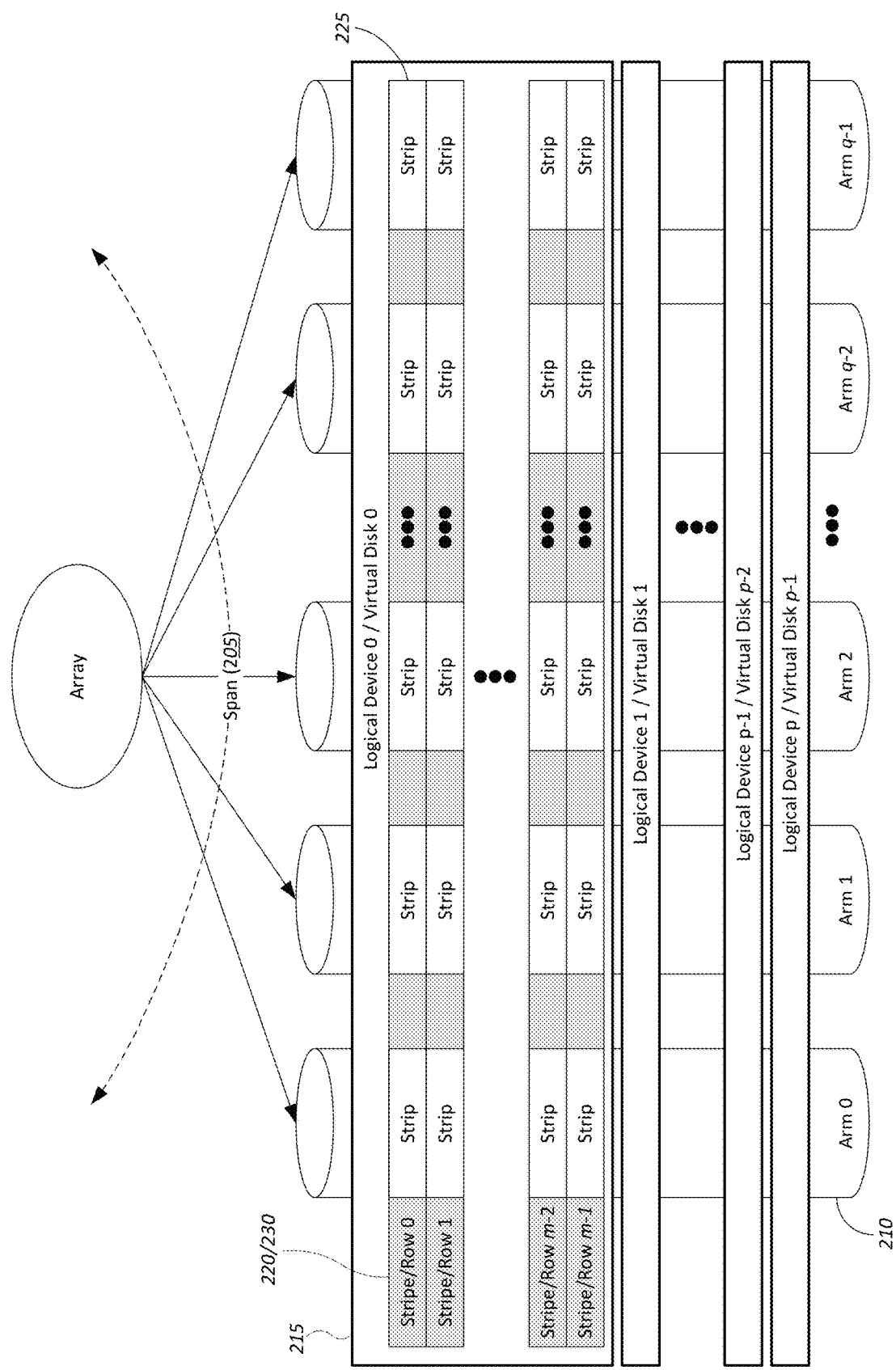
FIGS. 2A and 2B illustrate exemplary RAID arrays and virtual disks in accordance with various embodiments.
Figure 2B:
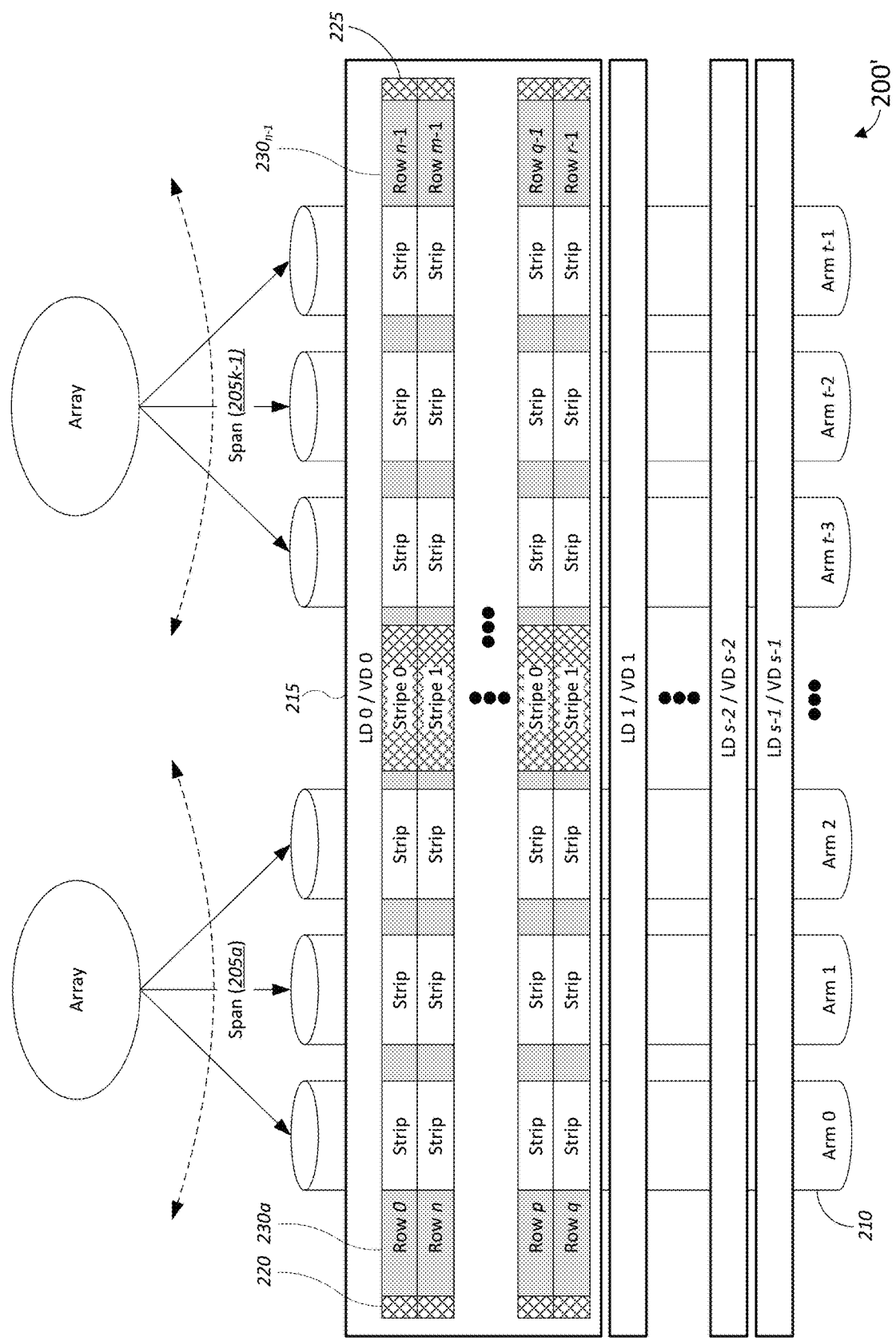

Some embodiments provide for a flexible write cache policy on a virtual disk. In some cases, a virtual disk is part of a RAID array. FIG. 2A illustrates a single span RAID array 200, while FIG. 2B illustrates a multiple-span RAID array 200'. The array 200 of FIG. 2A utilizes a single span 205 of physical disks 210, each of which is also referred to herein as an "arm" of the virtual disk. As illustrated on FIG. 2A, the array 200 is divided into a plurality of virtual disks 215. As illustrated by virtual disk 215*a*, a virtual disk 215 can include a plurality of stripes 220. Each stripe 220 includes a strip 225 from each arm 210 of the virtual disk 200. A "strip" therefore describes a unit of storage on a single physical disk (arm). In an aspect, each strip 225 is the same size. As used herein the term "logical block" (LBA) means the smallest amount of data that can be written or read in a single drive IO, and each LBA has a fixed size (e.g., 4KiB). Each strip 225 generally is a fixed number of LBA, such that a strip 225 might be a multiple of the LBA size (e.g., 64KiB, 128KiB, 25bKiB, etc.).

The multi-span array 200' of FIG. 2B is similar, except it includes multiple spans 205, each of which includes its own set of arms 210. In this case, a row 230 comprises the strips 225 from a single span 205, and the stripe 220 comprises the corresponding row 230 from each span 205. In some embodiments, all of the spans 205 are homogenous (e.g., each span 205 contains the same number of arms 210, the size of strips 225 in each span 205 is the same, etc.). In another aspect, a virtual disk 215 starts on a stripe boundary. Thus, when comparing the arrays 200 and 200', each stripe 215 in the single-span array 200 is the same as a row 230 in the multi-span array 200'.

Figure 3:
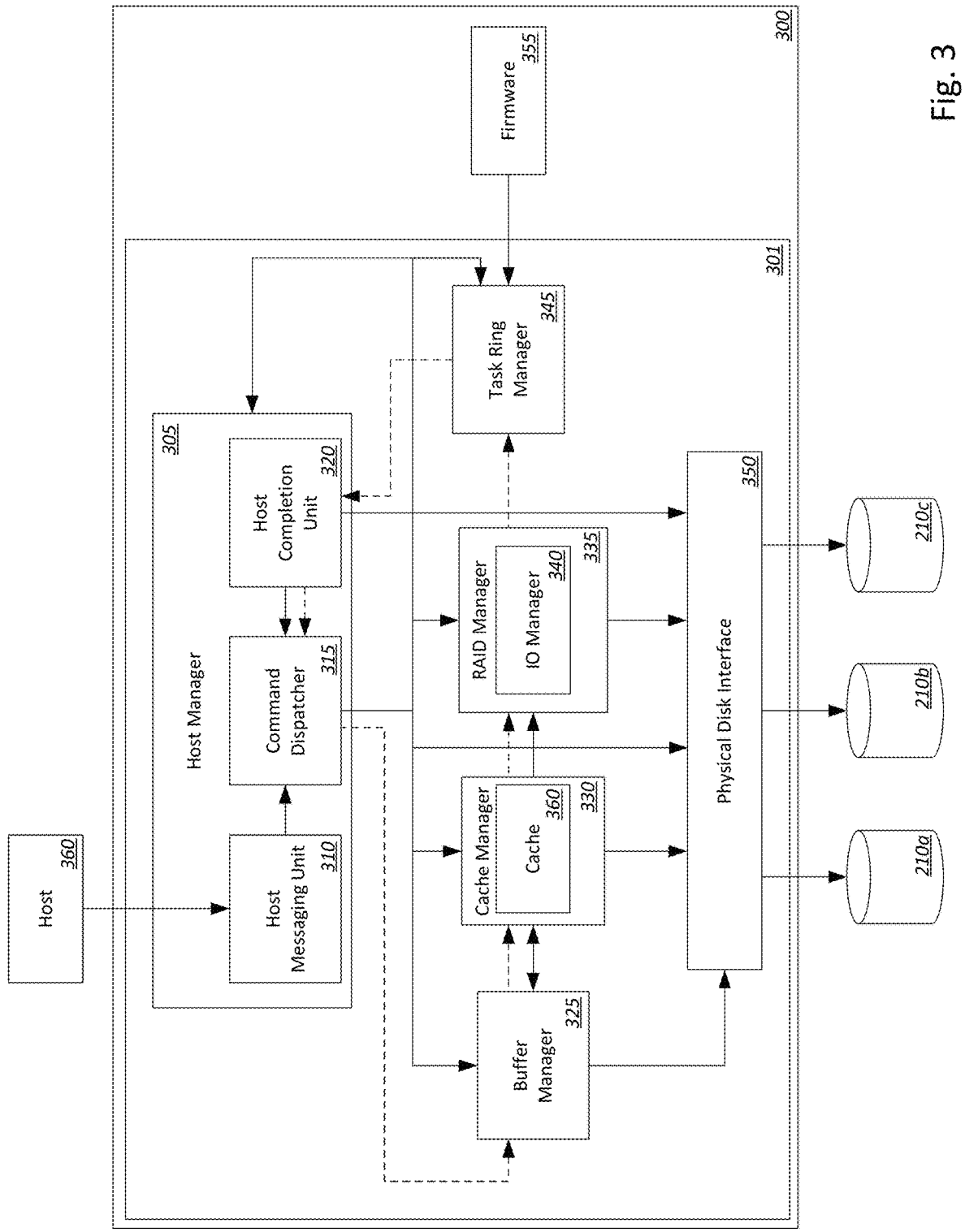
FIG. 3 is a block diagram illustrating a RAID controller in accordance with various embodiments.

FIG. 3 illustrates an exemplary architecture for a device 300 (e.g., a RAID controller) that can be used in various embodiments. In an aspect, the device comprises a set of hardware circuitry 301 (also referred to herein as simply "hardware"). This hardware circuitry 301 comprises several hardware components, each of which is encoded with circuitry to cause it to perform, inter alia, the functions and procedures disclosed herein. The hardware circuitry 301 can comprise, without limitation, a host manager 305. The host manager 305 includes a host messaging unit (HMU) 310, a command dispatcher unit (CDU) 315, and a host completion unit (HCU) 320. The hardware circuitry 301 further comprises, in some embodiments, a buffer manager 325 and/or a cache manager 330. The hardware circuitry 301 can further comprise a RAID manager 335, which can include an IO manager 340, as well as a task ring manager 345, and/or a physical disk interface 355.

It should be noted that the device 300 illustrated in FIG. 3 is merely exemplary in nature, and many embodiments can comprise more, fewer, or different hardware components. In certain embodiments, each component of the hardware circuitry 301 performs discrete functions or tasks. In other embodiments, the hardware circuitry 301 can be considered to collectively perform such tasks, and/or the same or different components might perform other discrete tasks. Hence, embodiments are not limited to the structure disclosed in FIG. 3 unless explicitly stated; moreover, to the extent that an embodiment states that "hardware circuitry" itself performs a particular task, such an embodiment does not require any particular hardware component to perform that task.

In some embodiments, the device further comprises firmware 355, which, unlike the hardware circuitry 301, often includes instructions that can be executed by a processor, such as a microprocessor. The firmware 355 might generally comprise instructions stored on a persistent form of data storage, such as a programmable read only memory (PROM) or one of several derivatives, nonvolatile RAM, programmable logic devices (PLD), field programmable gate arrays (FPGA) and/or the like. The firmware 355 can be more adaptable and/or updateable (in some cases) than the hardware circuitry 301 and can perform more complex tasks. The cost of this complexity, however, is speed. Each component of hardware circuitry 301 generally is optimized to perform one (or a few) relatively simple tasks, but to do so very quickly. In contrast, as described herein, some embodiments execute firmware instructions to perform more complex tasks, like storing diverted host IOs, calculating and allocating buffer segments, and performing maintenance tasks. In each of these cases, the firmware 355 is providing instructions to the hardware circuitry 301. But, as noted above, some of the efficiency gains enjoyed by various embodiments can result from requiring less of the firmware 355 and/or enabling the hardware circuitry 301 to perform tasks without the throttling inherent to the use of firmware 355 is performing the tasks.

In the illustrated embodiment, the HMU 310 provides communication between a host 360 and the device 300 (and/or components thereof), for example receiving host IOs from the host and providing IO completion confirmations to the host. The CDU 315 provides several control features for the device 300. For example, the CDU 315 can receive IOs, e.g. from the HMU 310, the firmware 355, etc. and, based on those requests, dispatch IO commands for execution (e.g., direct or transmit IOs to other components to be executed). Some embodiments feature a virtual disk property table (VDPT). In some embodiments, the VDPT is stored in and/or and maintained by the CDU 315. In some embodiments, the VDPT includes a VDPT element for each virtual disk configured in the system. For instance, the VDPT might comprise a VDPT element corresponding to each of the virtual disks 210a, 210b, 201c. In some embodiments, the VDPT stores a device handle for every virtual disk in the system; this device handle can be a unique identifier of each virtual disk. In a particular aspect of various embodiments, a VDPT element for a virtual disk 210 can be used to store a flexible write cache policy for that virtual disk.

As used herein, the term "IO" is used generally to mean any input-output operation on a virtual disk, and/or a request or command to perform such an operation. Such operations can include, without limitation read operations and write operations. In some cases, specific types of IO are mentioned herein where appropriate. While the term "IO" generally can mean a "read IO" (in which data is read from data source, such as a cache, virtual disk, etc.) or a write "write" IO" (in which data is written to a data sink, such as a cache, virtual disk, etc.), the present disclosure generally is directed to write operations; thus, unless the context dictates otherwise, the term "IO" as used herein, is meant to be synonymous with "write IO."

Regarding the specific types of IOs, the actual read or write operations on the physical disks of the virtual disk are referred to as "drive IOs." Likewise, the terms "execute," "perform," and "write" (and their derivatives) are used synonymously herein with regard to IOs, and they refer not only to the actual writing of data to disk, but any other actions that are performed along the path from receiving an IO from a host to writing an IO to cache or a virtual disk. Drive IOs are the only input-output operations actually executed on the physical media (e.g., reading data from or writing data to disk); all other types of IOs are actually requests or commands (at various levels of abstraction) to perform one or more drive IOs. Thus, the term "IO," when used without modifiers, can refer to both the actual drive IO and/or any other IO (e.g., requests or commands to perform actions that will result in one or more drive IOs), including without limitation all such IOs described herein.

For instance, one type of IO is a request from a host for data to be read from or written to the virtual drive; this type of IO is referred to as "host IOs." As used herein, the term "host" refers to any device or system (which can be hardware, software, etc.), other than the hardware 301 and firmware 355 of the device managing the RAID (e.g., a RAID controller), that provides requests or commands for IOs. Examples of hosts can include the operating system of a computer using a virtual disk for storage, a storage area network (SAN) device, any other sort of networking device, and/or intermediary devices between any of these and the device (e.g., a RAID controller) performing the procedures described herein. A host IO, in some embodiments, comprises a request to read or write data to the virtual disk; this requested data might be of various sizes, and often will need to be divided by the device for processing and/or for more efficient internal communication.

Thus, as described further below, the device itself can employ "accelerated IOs," (ACIO) which are internal communications within the device. As used herein, when a component is described as "transmitting," "directing," or "executing" or "writing" a host IO, an ACIO, or an IO in general, those terms are meant to include, without limitation, the transmission, direction, execution, writing, etc. of an ACIO that has been generated from a host IO.

In some embodiments, ACIOs can include parent ACIOs. One type of parent ACIO is generated by a component of the hardware 301 (e.g., CDU 315) after the hardware 301 has received a host IO and determined that it should be executed at that time (rather than diverted). The host IO might have been received directly from the host or might have been diverted earlier and then resubmitted for execution, e.g., by the firmware 355. The parent ACIO can then be routed internally for execution on the cache 365 (i.e., in write-back mode) and/or directly on the virtual disk (i.e., in write-through mode), as described in detail below. In some cases, the host IO might comprise a request for sufficient data reads/writes that it can be divided into different IOs (e.g., for parallel execution); in this case, the parent ACIO might be used to generate one or more child ACIOs, which are more granular requests for particular read/write operations on the virtual drive, and which can be performed by different threads in parallel, in accordance with some embodiments. In other cases, the parent ACIO is not used to generate any child IOs, and the parent ACIO can itself serve to accomplish the full request of the host IO. The parent ACIO (or, in appropriate cases the child ACIOs generated from the parent ACIO) then can be used to generate the drive IOs, which actually perform the read/write operations on the media of each physical disk. In some cases, a parent ACIO or child ACIO will be divided into a plurality of drive IOs, if the parent or child ACIO, for example, requires reads/writes to multiple arms, because each drive IO might be directed to a single arm (physical disk).

The HCU 320 is the endpoint for host IOs and receives notice, e.g., from the firmware 355, the cache manager 330, the IO manager 340, and/or any other hardware 301, when host IOs have been completed (e.g., completion confirmations). The HCU 320, in some embodiments, can provide such notice to the CDU 315, which can determine what, if any, additional actions should be taken with regard to a completed IO (e.g., notifying a host of the completion). In some embodiments, the buffer manager 325 handles interactions with buffer memory. In some embodiments, in which caching is employed for a virtual disk, the cache manager 330 handles the caching of IOs prior to writing those IOs to disk. In some embodiments, for example, the cache manager 330 is responsible for performing IOs on the cache 365, which, as described herein, can provide better performance for the host 360 than writing IOs to the virtual disk 200 (i.e., the arms 210). The cache manager 330 can also be responsible for flushing IOs stored in the cache 365 to the virtual disk 200 when appropriate. While the cache 365 is shown as being incorporated by the cache manager 330, that arrangement is exemplary, and in many embodiments, the cache 365 will be located elsewhere on the device 300. In general, the cache 360 is a set of reserved memory (e.g., DRAM) that can be used to temporarily hold IO transactions rather than writing the IOs directly to the virtual disk. Various embodiments can employ flexible caching strategies, examples of which are described herein.

In contrast, the RAID manager 335 handles most interactions between the device 300 and the physical disks (arms) 210. In particular embodiments, the RAID manager 335 comprises the IO manager 340, which handles low-level interaction with the physical disks 210, including the creation of drive IOs to instruct the physical disks 210 to execute the actual reads and writes on the physical media of the disks 210. This interaction is provided through the physical disk interface 355, which provides direct, low-level access to communicate drive-level instructions, such as drive IOs, to the physical disks. The physical disk interface 355 can comprise one or more network interface cards or other communication cards or ports to communicate with the physical disks 210 over a network such as a storage area network (SAN), serial attached small computer system interface (serial attached SCSI or SAS), connections, fibre channel connections, and/or the like.

The task ring manager 345 manages a task ring, which provides high speed communications between the various components of the device 300, including the firmware 355 and the various components of the hardware 301. In a particular embodiment, the task ring carries messages (task ring messages or TRM) that are local to the controller 300 and are used for a variety of purposes while the controller 300 is operating. In an aspect, some TRMs can have an local message index (LMID) field or frame that can hold an ACIO and/or a reference to an ACIO. In another aspect, each ACIO is transmitted in its own TRM. The transmission of ACIOs by TRM provides for enhanced performance in the processing of IOs. For example, a host IO generally is transmitted using a standard message passing interface (MPI) message, which provides relatively slow communications compared to the task ring. This MPI message can be received by the hardware 301 (e.g., the CDU 315), which can create a new parent ACIO from the host IO, if the hardware 301 determines that the host IO should be executed; if not, the hardware 301 (or a component thereof) can copy the data from the host IO into an LMID for diversion to the firmware 455 over the task ring. As noted above, in some cases, the CDU 315 (or another component) might generate child IOs from the parent IO, in which the IO data and other parameters from the parent ACIO might be shared and/or divided among the child ACIOs, for example as described in further detail below. The parent ACIO and/or child ACIOs can then be transmitted to other components for execution, e.g., as described below.

Figure 4:
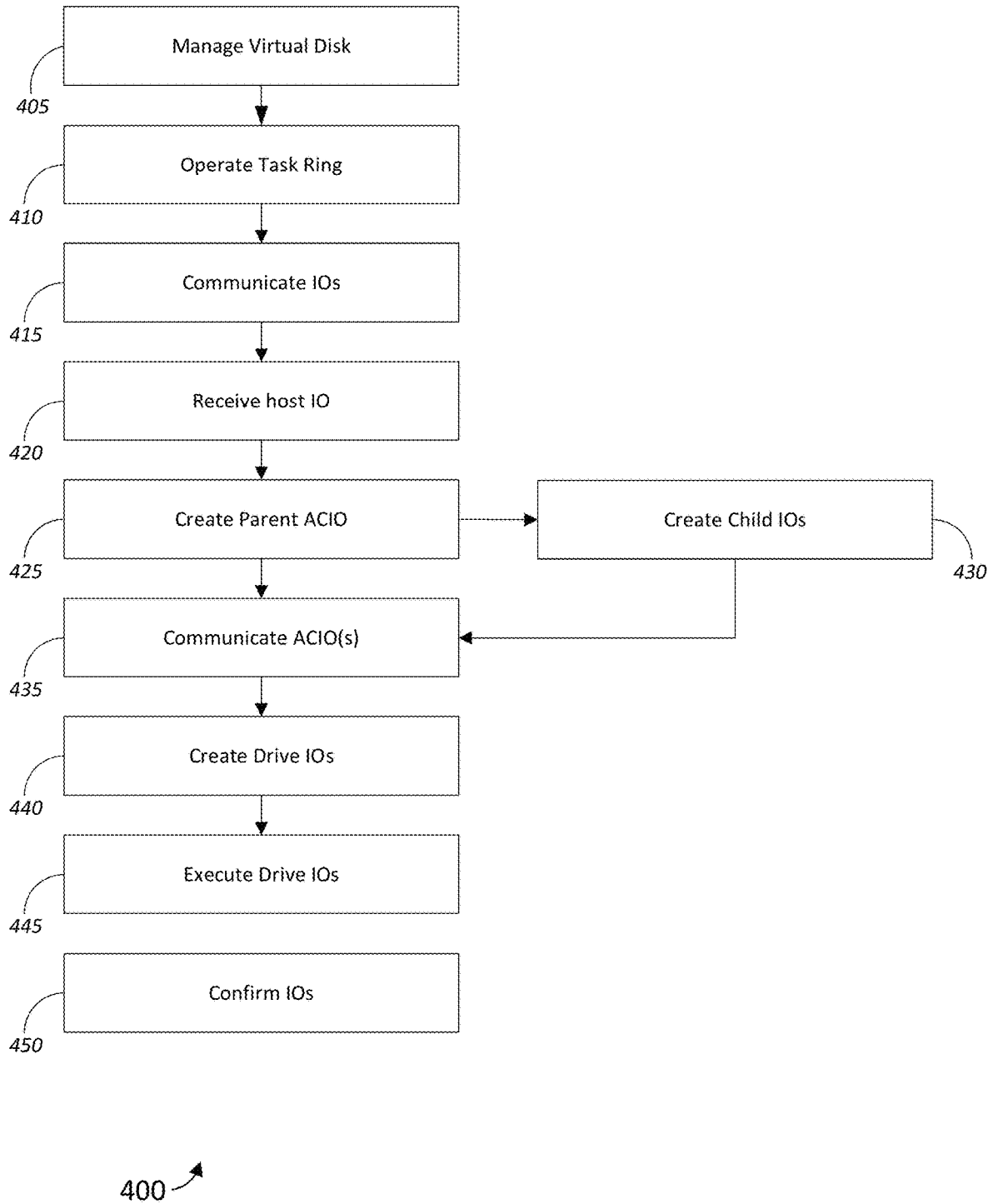
FIG. 4 is a process flow diagram illustrating various operations of the RAID controller of FIG. 3 in accordance with various embodiments.

FIG. 4 illustrates a method 400 showing components of the exemplary device 300 above in one mode of operation. The method 400 comprises, at block 405, managing a virtual disk. As noted above, a virtual disk can comprise one or more spans, each of which can comprise one or more arms; each arm might comprise a physical disk. Also as noted above, the virtual disk can comprise a plurality of stripes, each of which can comprise a row from each of the one or more spans; each row of a span can comprise a strip from each of the arms in the span, each of the strips comprising one or more, such that the plurality of LBA comprising one or more LBA from each of the arms of the span.

Managing a virtual disk, therefore, can comprise many different operations, including without limitation, reading and/or writing data to the physical disks that serve as arms for the virtual disk, controlling flexible caching policies (e.g., as described herein), organizing the physical disks into arms, arms into one or more spans, and/or spans into one or more virtual disks, maintaining and/or updating such organization (e.g., online capacity expansion operations or RAID level migration operations), performing maintenance operations (or portions thereof) on a virtual disk, and/or the like. In some respects, these different operations might be divided among various components of a device 300; as used herein, "managing" a virtual disk means performing all or part of any such operations. As such, different components of the device can be considered to be managing a virtual disk, and the device itself can be considered to be managing a virtual disk.

At block 410, the method 400 can comprise operating a task ring for communicating messages (TRMs) between the plurality of components. While some of the components do include various connections (as illustrated by the solid arrows), the task ring (indicated by dashed arrows) provides a high-speed communication ring that connects the task ring manager 345, the HCU 320, the CDU 315, the buffer manager 325, the cache manager 330, and the RAID manager 335. The task ring manager 345 also includes communication with the firmware 355. In particular, the task ring provides a way for components to communicate IOs as needed. For example, if an IO should be directed to, e.g., the cache manager 330 and/or the IO manager, the host IO can be communicated using the task ring (e.g., back and forth from CDU 315 and the firmware 355); as noted above, in some embodiments, the host IO can be copied into an LMID for this transmission.

Thus, the method 400 includes communicating a plurality of host IOs via the task ring (block 415). As disclosed further below, host IOs can be executed according to a flexible write cache policy. Thus, in some embodiments, when a host IO is received in the hardware circuitry 301 (block 420), the hardware 301 determines whether the IO should be written in write-back mode (i.e., to cache 360) or in write-through mode (i.e., to the virtual disk 210) and can direct the IO to the appropriate component for execution via the task ring.

As noted above, in some cases, before transmitting and/or directing a host IO, the device 300 might create an ACIO to transmit the data from the host IO; thus, the method 400 can include generating (e.g., creating) a parent ACIO from the host IO (block 425) and/or, if necessary, generating (e.g., creating) one or more child ACIOs from the parent ACIO (block 430). (As noted above, in some cases, the device 300 might not create any child ACIOs and might instead pass the parent ACIO to the next step in the process. In an aspect, the child IOs each can be performed by a different IO thread in the IO manager 340 and/or cache manager 330, allowing for parallel execution of different parts of the host IO/parent IO. In some embodiments the CDU 315 receives these host IOs and generates the ACIOs, although different embodiments can employ different hardware 301 and/or logic to perform these operations.

The parent ACIO or child ACIOs can then be communicated (block 435), e.g., via the task ring and/or directly, to be performed on the virtual disk or the cache. (From this point, the method 400 proceeds in similar ways whether with a parent ACIO or child ACIOs, so the general term ACIO will be used to indicate that similarity.) In some cases, the ACIO(s) can be communicated to the IO manager 340, while in other embodiments, the ACIO(s) can be communicated first to the cache manager 330, which can execute them on the cache 360, and/or can forward the ACIO(s) to the IO manager 340 if necessary. Once again, however, embodiments do not require the performance of these operations by any specific component. When it is determined that the ACIOs should be executed in write-back mode, these ACIO(s) can be used (e.g., by the IO manager 340) to generate a plurality of drive IOs (block 440), each of which, as noted above, might send instructions to a different arm (physical disk) of the virtual disk. These drive IOs then can be executed on the virtual disk (block 445), e.g., by communications from the device 300 (and/or a specific component thereof, like the IO manager 340, to name one example) transported via the physical disk interface 350 to the relevant physical disk(s) 210 on which each drive IO should be performed. As noted, for IOs that should be cached, the parent ACIO or child ACIOs can perform the read or write directly on the cache and return, instead of executing drive IO(s) on the physical disks.

At block 450, the IOs might be confirmed. In some embodiments, for example, the IO manager 340 and/or cache manager 330 might receive confirmation of the reads/writes from the physical disks 210 and/or physical disk interface 250 and/or might transmit confirmation messages (e.g., via LMID), e.g., to the firmware 355, HCU 320, etc., to confirm that the host IO has been successfully executed.

This basic process 400 can be used (and/or modified) in various ways throughout various embodiments, as described in further detail below.

Figure 5:
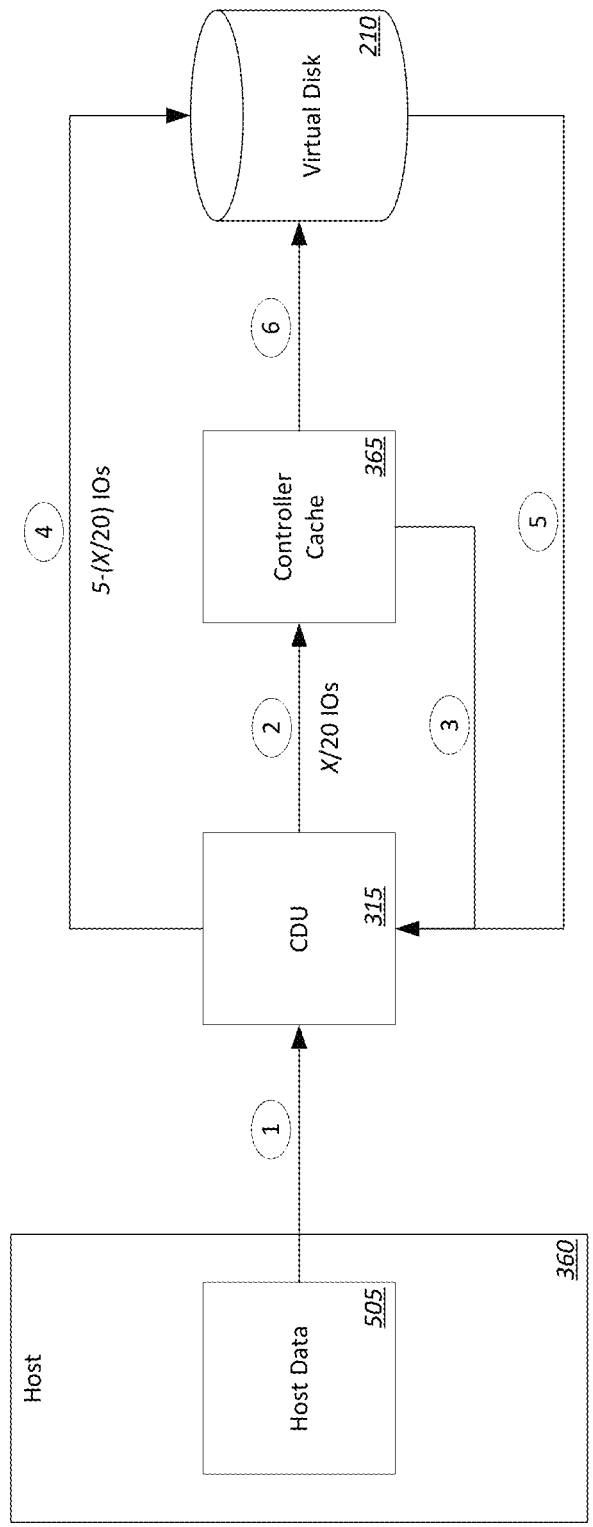
FIG. 5 illustrates a virtual disk operating with a flexible write cache policy in accordance with various embodiments.

FIG. 5 illustrates a simplified system 500 that implements an exemplary flexible write cache policy. The system 500 includes a host 360, a CDU 315, a controller cache 365, and a virtual disk 210 configured with a flexible write cache policy specifying a write-back proportion of X %, with a group size of 5. The host 360 submits host data 505 as a group of host IOs to be written to the virtual disk 210. In this example, because the group size is 5, the IOs are grouped into sets of 5, such that X/20 is the number of IOs per set that will be written in write-back mode, and 5-(X/20) is the number of IOs per set that will be written in write-through mode. After these 5 IOs have been executed, the next set of 5 IOs will be written in the same manner, and this process will repeat until all of the IOs have been executed.

The CDU 315, having been configured to establish the flexible write cache policy of the virtual disk 210, executes a first set (X/20) of the IOs for the host data in write-back mode (operation 2), directing the first set of IOs to the cache 365 for execution. Each of the IOs in the first is confirmed as soon as that IO is executed (in write-back mode) on the cache 365 (operation 3). The CDU 315 also executes a second set (5-(X/20)) of the IOs for the host data in write-through mode (operation 4), directing the second set of IOs to the virtual disk 210 for execution. These IOs are confirmed to the CDU after being executed on the virtual disk (operation 5). At some later time, the system 100 flushes the first set of IOs from the cache 365 to the virtual disk 210 (operation 6).

Figure 6:
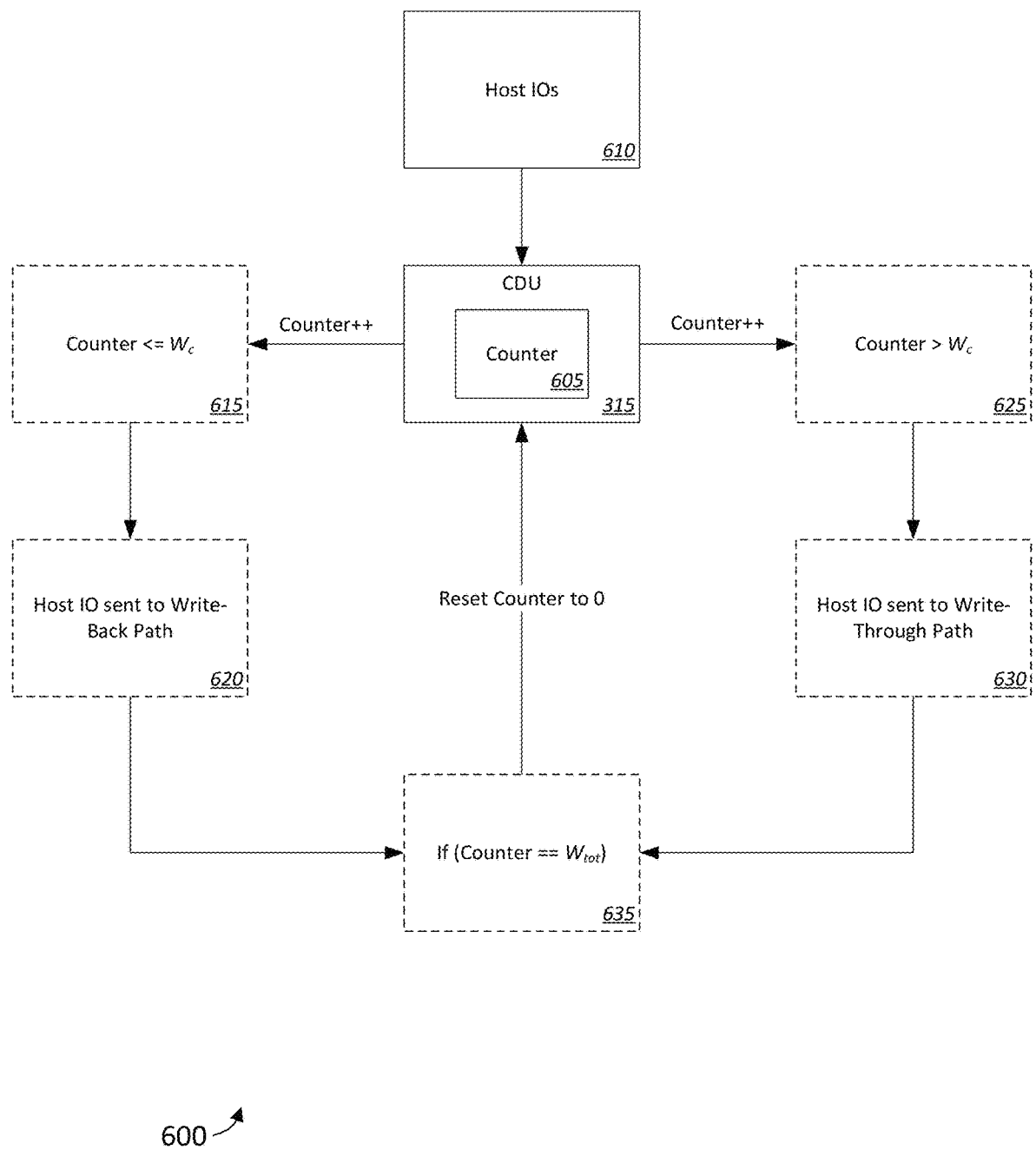
FIG. 6 is a functional diagram illustrating a technique for implementing a flexible write cache policy in accordance with various embodiments.

Some embodiments employ a counter to implement a flexible write cache policy. FIG. 6 is a functional diagram of a technique 600 for implementing the flexible write cache policy of FIG. 5 using a counter in accordance with some embodiments. In the illustrated technique, a CDU 315 is configured to store a counter 605. It should be noted, however, that various embodiments might use a different component to store and/or manage the counter 605. In an aspect, a flexible write cache policy might be expressed with the following relationships:

$$W_{tot} = (W_C + W_D)$$

$$P_C = \frac{W_C}{W_{tot}}$$

$$P_D = \frac{W_D}{W_{tot}} = \frac{W_{tot} - W_C}{W_{tot}}$$

where $P_C$ represents a first proportion of IOs to be performed in write-back mode, $P_D$ represents a second proportion of IOs to be performed in write-though mode, $W_{tot}$ represents a total number of IOs executed per cycle, as specified by an IO group size of the flexible write cache policy, $W_C$ represents a number of IOs executed in write-back mode per cycle, and $W_D$ represents a number of IOs executed in write-through mode per cycle.

For instance, if the user expressed a preferred write-back proportion $P_C$ as X % and the group size $W_{tot}$ is set at 5 (such that the counter resets after 5 IOs have been written), the number of IOs to be performed in write-back mode, $W_C$, could be expressed as X/20 (i.e., converting $P_C$ into a fraction of X/100 and multiplying that value by the group size of 5 to arrive at $W_C$).

In operation, when the CDU 315 receives a host IO 610, it checks the counter to determine the value of the counter 605. If the value of the counter 605 is less than or equal to $W_C$ (X/20) (block 615), the CDU 315 sends the host IO 610 (perhaps in the form of one or more ACIOs, as described above) to the write-back path to be written in write-back mode (block 620) and increments the counter 605. In some embodiments, for example, as described below, the CDU 315 (or another device) might direct the host IO 610 to a component (e.g., a cache manager, etc.) responsible for executing IOs on the cache. If the counter is greater than $W_C$ (block 625), the IO 610 is sent to the write-through path to be executed in write-through mode (block 625). In some embodiments, for example, as described below, the IO 610 might be directed to a component (e.g., an IO manager, etc.) responsible for executing IOs on the virtual disk. In either case, when the counter reaches 5 (block 635), the CDU 315 resets the counter to 0 and continues the process. Thus, if $P_C$ were set at 60%, the CDU would perform a cycle of (1) transmitting the first 3 IOs ($P_C \cdot W_{tot}$) or, equivalently, ($W_C$) to be executed in write-back mode, (2) incrementing the counter for each of these 3 IOS, (3) transmitting 2 IOs ($(1-P_C) \cdot W_{tot}$) or, equivalently, ($W_D$) to be executed in write-through mode, (4) incrementing the counter for each of these IOs, and then (5) resetting the counter to 0 after the 5 IOs ($W_{tot}$) have been performed, to repeat the cycle for the next 5 host IOs ($W_{tot}$) received.

Figure 7:
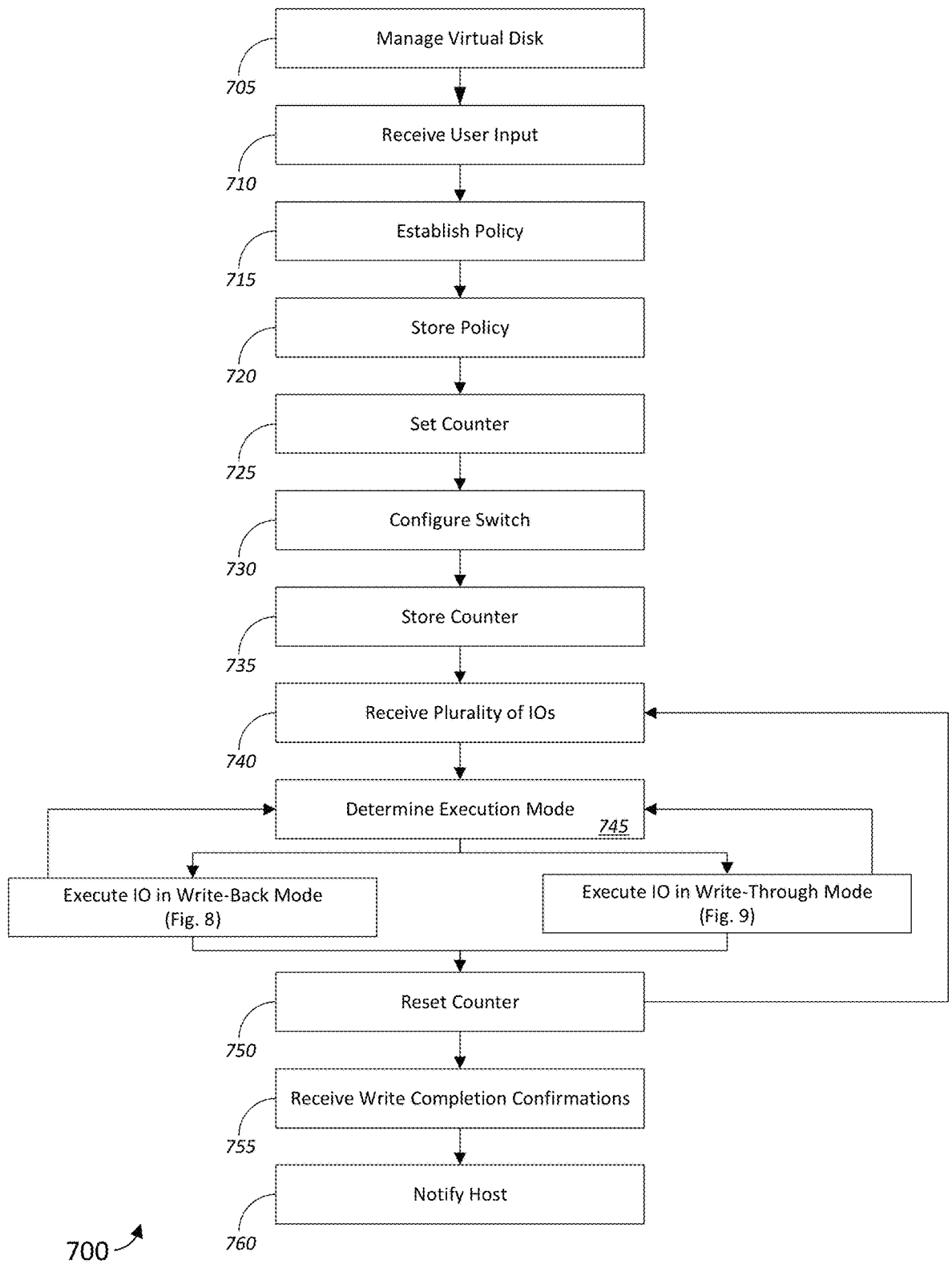
FIG. 7 is a flow diagram illustrating a method of operating a virtual disk with a flexible write cache policy, in accordance with some embodiments.
Figure 8:
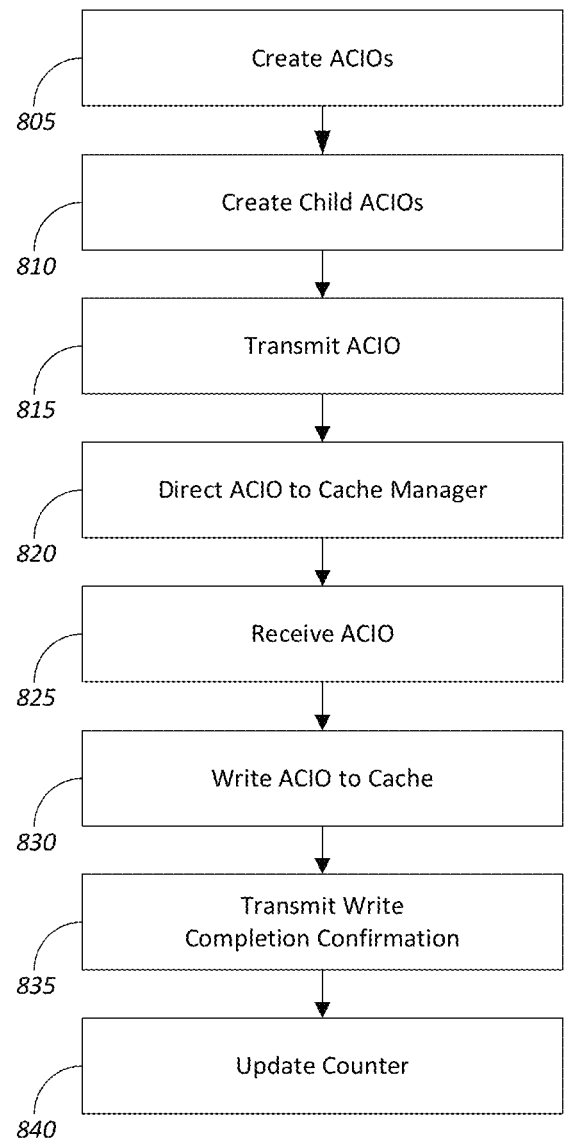
FIG. 8 is a flow diagram illustrating a method of executing IOs in a write-back mode in accordance with some embodiments.
Figure 9:
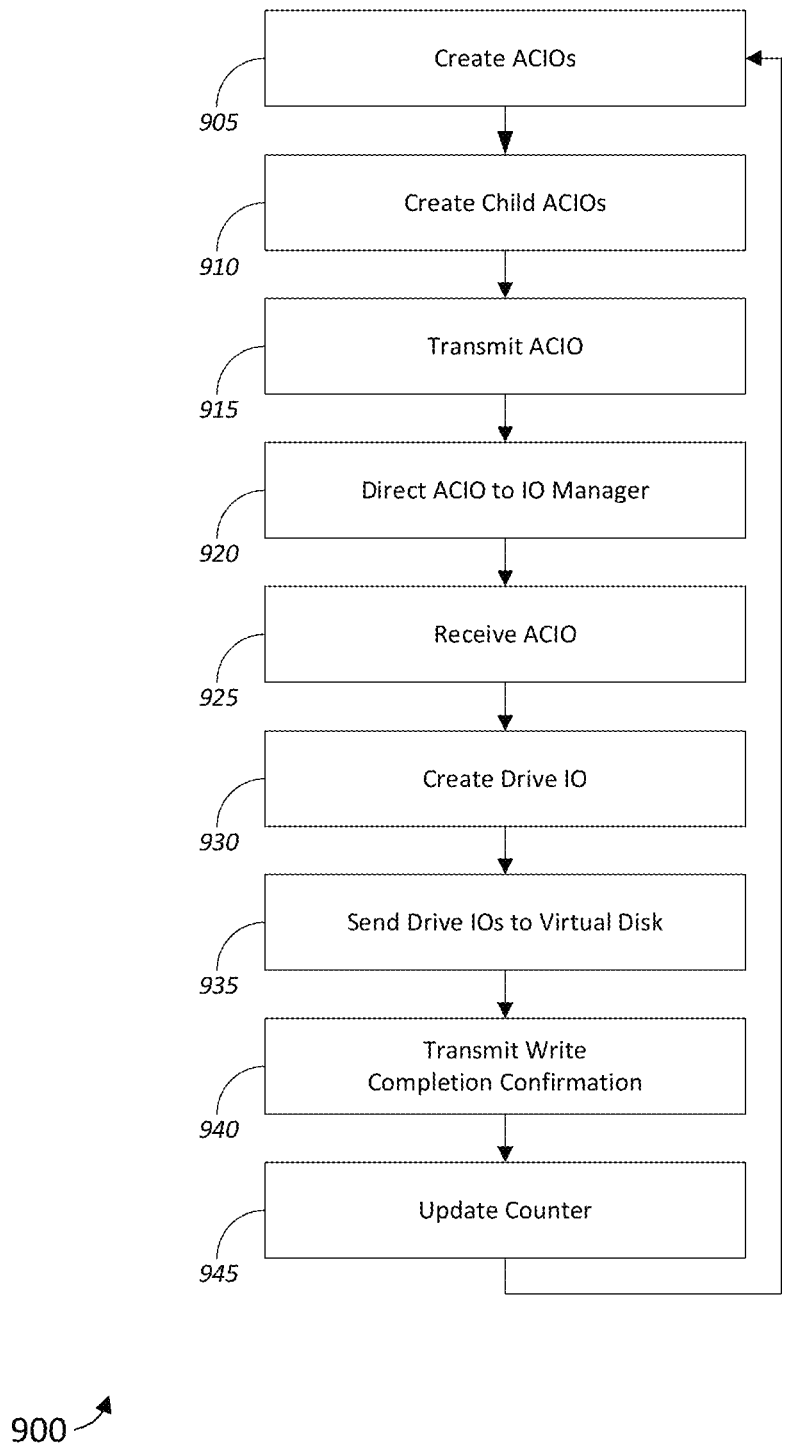
FIG. 9 is a flow diagram illustrating a method of executing IOs in a write-through mode in accordance with some embodiments.

FIG. 7 is a flow diagram illustrating a method 700 of executing IOs using a flexible write cache policy in more detail; FIGS. 8 and 9 are flow diagrams illustrating, respectively, a method 800 of executing an IO in a write-back mode and a method 900 of performing an IO in a write-through mode. In some embodiments, some or all operations of the methods 700, 800, and/or 900 can be performed by a RAID controller and/or components thereof, and certain operations are described below in the context of such a RAID controller for illustrative purposes. Other embodiments are not so limited, however, and any device (of any hardware and/or software architecture) capable of performing the functions described in connection with the methods 700, 800, and/or 900 can perform some or all parts of these methods in accordance with various embodiments.

In a set of embodiments, the method 700 comprises managing a virtual disk comprising a plurality of arms, each of the arms comprising physical storage on a physical disk (block 705), including without limitation as described above in the context of FIG. 4 (e.g., block 405). In some embodiments, the method 700 comprises receiving user input indicating a preferred "write-back ratio" of write back IOs to total IOs (block 710). Any of a variety of techniques can be used to provide and/or collect this user input. Merely by way of example in some embodiments, this user input might be a command to create a new virtual disk having a flexible write cache policy, including without limitation the command-line commands described above; in other embodiments, the user input might be provided by a graphical user interface (GUI) tool. Other user input techniques are possible as well. In some embodiments, the preferred ratio can be expressed as a fraction and/or percentage value, and in particular embodiments, the percentage value can be constrained to one of a limited plurality of discrete percentages and/or fractions, such as multiples of 20% or ⅕, multiples of 10% or ⅒, etc.

In some embodiments, the method 700 comprises establishing a flexible write cache policy, (block 715), e.g., based on the preferred write-back ratio. In an aspect, therefore, the flexible write back policy might specify a first proportion $P_C$ of IOs to be performed in write-back mode; and a second proportion $P_D$ of IOs to be performed in write-through mode. In some embodiments, the flexible write cache policy might further comprise a group size $W_{tot}$ of total IO that are written (in either mode) before the counter resets. This group size, which can be of any size, e.g., 5 IOs, 50 IOs, 500 IOs, etc., can tune the granularity with which the write-back and write-through IOs respectively, are distributed, if desired. In some cases, this group size is configurable. In other cases, the group size might be fixed.

In some embodiments, the method 700 comprises storing the flexible write cache policy (block 720). As noted above, some embodiments have a VDPT, which includes a VDPT element for each virtual disk. In some embodiments, the CDU 315 manages the VDPT. In certain embodiments, the VDPT element for a virtual disk can be used to store the flexible write cache policy for that virtual disk.

In some embodiments, the method 700 comprises setting a counter to implement the flexible write cache policy. In one aspect, the counter might be a discrete hardware component, which might be incorporated in the CDU 315 or another component. In an aspect, the counter can implement a repeating cycle of IO operations expressed with the following expressions (block 725). The CDU 315, the firmware 355 or any other component can set the counter.

In some embodiments, therefore, the setting the counter can comprise setting the group size ($W_{tot}$), setting $P_C$, and/or setting $P_D$ (and/or in some embodiments, simply setting $W_C$ and $W_D$). In some embodiments, setting the counter can comprise configuring the counter to reset after $W_{tot}$ IOs have been performed. In some embodiments, the counter also might be configured to reset at start of day (SOD) and/or any other appropriate time.

In some embodiments, the counter (or the CDU 315) comprises a switch that controls whether each of the IOs is directed toward the cache (on the write-back path) or toward the virtual disk (on the write-through path). In such cases, the method 700 can comprise configuring the switch according to the flexible write back policy (block 730). For instance, in some embodiments, the method 700 might comprise configuring the switch to instruct the device to perform $W_C$ IOs in write-back mode before the counter resets and/or configuring the switch to instruct the device to perform $W_D$ IOs in write-through mode before the counter resets. The switch might operate in any suitable fashion: For example, in some cases, the switch might control the device 300 to alternate write-back mode IOs with write-through IOs until either $W_C$ write-back IOs or $W_D$ write-through IOs (as applicable) have been performed, and then continuing with the remaining IOs until $W_{tot}$ has been reached. In other embodiments, the switch might control the device to perform $W_C$ IOs in write-back mode and then perform IOs in write-through mode until $W_{tot}$ IOs have been performed (or vice versa).

In some cases, the functionality ascribed above to the switch might be performed by another component, such as the CDU 315 itself, and the specific functionality of the CDU in directing IOs to the write-back path or the write-through path need not be configured; the CDU might be hardwired, for example, to write $W_C$ IOs in write-back mode and then write the remaining IOs in write-through mode until $W_{tot}$ IOs have been performed, or in other embodiments, to write $W_C$ IOs in write-back mode then write $W_D$ IOs in write-through mode before resetting the counter. (It should be appreciated that these two formulations can be functionally similar.)

In some embodiments, the method 700 comprises storing the counter; (block 735). The counter might be stored permanently and/or temporarily in a set of registers in the CDU 315 or another location, might be stored in DRAM, might be stored in the VDPT or another applicable storage structure. In some embodiments, configuring the counter might comprise setting configuration registers that program a hardwired counter with $P_C$ (e.g., if $W_{tot}$ is a value fixed in hardware), which would allow the CDU 315 (or another component) to derive the other parameters (including in particular $W_C$). For instance, if the firmware 355 (or another device) sets a field in the VDPT element for a particular virtual disk 210 to store a value of $P_C$, the CDU 315 (or another component) could look up this stored value and set the counter accordingly; this operation could be considered to configure the counter in some embodiments. From these examples, a skilled artisan can appreciate that the counter can take a variety of forms, and configuring the counter can involve many different procedures, in accordance with various embodiments.

In some embodiments, the method 700 comprises receiving a plurality of IOs; (block 740). Merely by way of example, the HMU 310 might receive the plurality of host IOs from the host 360 and pass that plurality of host IOs to the CDU 315 for execution. In some embodiments, the device might execute a first plurality of write input-output operations (IO) in write-back mode, based at least in part on the flexible write cache and/or execute a second plurality of IOs in write-though mode, based at least in part on the flexible write cache policy. In an aspect, this comprise evaluating each IO received (e.g., using the process of FIG. 6) and determining (e.g., with the CDU 315) whether write-back mode or write-through mode should be used to execute each of the received IOs, based on the flexible write cache policy (which might, for example, establish the value of $W_C$) and/or the status of the counter (e.g., whether the counter value is greater than $W_C$) accordingly (block 745). Any suitable method of making this determination can be employed in various embodiments. One exemplary process is described above in the context of FIG. 6.

The IO can then be executed using the determined mode. For example, if the CDU 315 (or another component) determines that the instant IO should be executed in write-back mode, FIG. 8 illustrates one exemplary method for executing an IO in write-back mode (i.e., executing an IO directed or sent to a write-back path).

In some embodiments, the method 800 comprises creating one or more ACIOs from the host IO (block 805), e.g., as described above. In some embodiments, the device 300 can employ parallel processing of ACIOs, and in such (or other) embodiments, the method 800 can comprise creating a set of two or more child ACIOs from at least one of the parent ACIOs (block 810). In some embodiments, the method 800 comprises transmitting the created ACIO(s) (e.g., using an LMID in a TRM for each ACIO) to be executed in write-back mode (block 815). At block 820, this transmission can involve directing the ACIO(s) to a first hardware component of the device (e.g., the cache manager 330). In some embodiments, the method 800 comprises receiving the ACIO(s) (block 825), e.g., at the cache manager 330 and/or executing the ACIO(s) one the cache (block 830) (e.g., writing the ACIO(s) to the cache with the cache manager 830). After the ACIOs have been written to the cache, the method 800 can comprise transmitting a completion confirmation for each of the cached ACiOs (block 830). In an aspect, this completion confirmation can be transmitted to the CDU 815 and/or to the HCU 820, which might relay the completion confirmation to the CDU.

In some embodiments, the method 800 comprises updating (e.g., incrementing) the counter for every ACIO transmitted for execution on the cache (block 835). The timing of the counter update can vary in different embodiments. In some cases, the CDU might update the counter as soon as it transmits the ACIOs for execution (or even before or during this transmission). In other cases, the CDU 315 might not update the counter until it receives the confirmation from the cache manager 330. (In an aspect, however, the CDU 315 will need to increment the counter before it processes the next host IO, so this might constrain the timing on when the CDU 315 updates the counter). In some embodiments, a component other than the CDU 315 (e.g., the cache manager 330, the firmware 355, etc.) might update the counter.

On the other hand, if the evaluation of the host IO resulted in a determination that the IO should be executed in write-through mode, FIG. 9 illustrates a method 900 of executing an IO in write-through mode (i.e., executing an IO directed or sent to a write-through path) that can be used. Specifically, the method 900 illustrates the execution of IOs in write-through mode in a non-parity virtual disk. As with the method 800 of FIG. 8, the method 900 can include, creating one or more ACIOs from the host IO (block 905) and/or creating a set of two or more child ACIOs from at least one of the parent ACIOs (block 910). In some embodiments, the method 900 comprises transmitting the created ACIO(s) (e.g., using an LMID in a TRM for each ACIO) to be executed in write-though mode (block 915). In this case, the transmission can involve directing the ACIO(s) to a different hardware component of the device (e.g., the IO Manager 340) (block 920).

In some embodiments, the method 900 comprises receiving the ACIO(s) (block 925), e.g., at the IO manager 340. As noted above, in executing IOs on a virtual disks, the device 300 (or a component thereof, such as the IO manager) can create drive IOs from the ACIOs, and the method 900, correspondingly, can comprise creating one or more drive IOs from each of the second plurality of ACIOs (block 930). In some embodiments, the method 900 comprises sending each of the drive IOs to the virtual disk for execution (block 935), e.g., by transmitting the drive IOs to the physical disk interface 350, which sends the drive IOs to the appropriate physical disks for execution. After the drive IOs have been written to the physical disks, the IO manager 340 (or another component) can receive drive IO completion confirmations and transmit corresponding IO completions (block 940), e.g., to the HCU 320 and/or CDU 315. In some embodiments, the method 900 also comprises updating (e.g., incrementing) the counter for every ACIO transmitted for execution on the cache (block 945). In some embodiments, a component other than the CDU 315 (e.g., the IO manager 330, the firmware 355, etc.) might update the counter.

As noted above, the method 900 illustrates a method of performing write-through IOs on a non-parity virtual disk. In some embodiments, the method for performing write-through IOs on a parity virtual disk can be a hybrid of the methods 800 and 900. For instance, in some embodiments, the CDU 315 might send ACIOs to the cache manager 330 (as in the method 800) instead of the IO manager 340, so that the cache manager 330 can calculate the parity values for the IOs. However, unlike the method 800, in this case, the cache manager 330 employs the cache only for this purpose and then, as soon as possible, flushes the cache to disk. In some embodiments, this can involve the cache manager 330 sending ACIOs to the IO manager, which can generate drive IOs (as described in the context of FIG. 9) and transmit those drive IOs to the physical disk interface 350 for execution on the physical disks. Moreover, like the method 900, in the hybrid process of a write-through mode in a parity environment, the device 300 (or a component thereof, such as the IO manager 340) would wait to receive the drive IO completion confirmations before sending ACIO completion confirmations to the HCU 320 and/or CDU 315, rather than sending completions from the cache manager 330 as soon as the IOs were written to the cache.

Returning to FIG. 7, the process can be repeated from block 745 for each host IO received (e.g., as soon as the counter has been updated and/or the next host IO has been received). In this way, the method 700 can be used to execute a first plurality of IOs (i.e., all of the host IOs that are executed in write-back mode) on the cache, based at least in part on the flexible write-back policy, and to execute a second plurality of IOs (i.e., all of the host IOs that are executed in write-through mode) directly on the virtual disk, based at least in part on the flexible write-back policy.

In some embodiments, the CDU 315 (or another component) tracks the status of the counter (e.g., as noted above to determine the execution mode for each host IO). When the counter reaches or exceeds a specified value (e.g., $W_{tot}$), the CDU 315 (and/or another component) can reset the counter (e.g., to 0) and the process continues from block 740.

In some embodiments, the method 700 comprises receiving a plurality of write completion confirmations (block 755), e.g., from the cache manager 330/or and the IO manager 340; this plurality can include a completion confirmation for each IO written to the cache or the virtual disk, depending on the write mode used. As noted, in some embodiments, the HCU 320 receives these completions and passes them to the CDU 315. Upon receiving all of the completion confirmations for a particular host IO, the CDU 315 (and/or another component) notifies the host of the completion of that host IO (block 760). In some embodiments, this notification can comprise the CDU 315 notifying the HMU 310 of each completed host IO; the HMU 315 can receive these notifications and transmit a message to the host upon receiving each of the plurality of notifications from the CDU 315.

Exemplary Embodiments

Certain exemplary embodiments are described below. Each of the described embodiments can be implemented separately or in any combination, as would be appreciated by one skilled in the art. Thus, no single embodiment or combination of embodiments should be considered limiting.

Some embodiments provide devices. A device in accordance with one embodiment is a redundant array of independent disks (RAID) controller to manage a virtual disk comprising a plurality of arms. In some embodiments, each of the arms comprising physical storage on a physical disk. In some embodiments, the RAID controller comprises a cache comprising a random-access memory (RAM);

In some embodiments, the RAID controller comprises a virtual disk property table (VDPT). In some embodiments, the RAID controller comprises a cache manager In some embodiments, the cache manager comprises hardware circuitry to receive a first plurality of write input-output operations (IO). In some embodiments, the cache manager comprises hardware circuitry to execute each of the first plurality of IOs in write-back mode. In some embodiments, the cache manager comprises hardware circuitry to transmit a completion confirmation for each completed IO executed in write-back mode;

In some embodiments, the RAID controller comprises an IO manager. In some embodiments, the IO manager comprises hardware circuitry to receive a second plurality of IOs. In some embodiments, the cache manager comprises hardware circuitry to execute each of the second plurality of IOs on the virtual disk. In some embodiments, the cache manager comprises hardware circuitry to transmit a completion confirmation for each IO executed on the virtual disk. In some embodiments, the RAID controller comprises firmware. In some embodiments, the firmware comprises logic to receive user input indicating a preferred ratio of write-back IOs to total IOs. In some embodiments, the firmware comprises logic to establish a flexible write cache policy based at least on the preferred ratio of write-back IOs to total IOs. In some embodiments, the flexible write cache policy specifies a first proportion of IOs to be performed in write-back mode ($P_C$) and/or a second proportion of IOs to be performed in write-though mode ($P_D$). In some embodiments, the firmware comprises logic to store the flexible write cache policy in the VDPT;

In some embodiments, the firmware comprises logic to set a counter to implement the flexible write cache policy. In some embodiments, the counter implements the flexible write cache policy using the following relationships:

$$W_{tot} = (W_C + W_D)$$

$$P_C = \frac{W_C}{W_{tot}}$$

$$P_D = \frac{W_D}{W_{tot}} = \frac{W_{tot} - W_C}{W_{tot}}$$

where $W_{tot}$ represents a total number of IOs executed per cycle as specified by an IO group size of the flexible write cache policy, $W_C$ represents a number of IOs executed in write-back mode per cycle, and $W_D$ represents a number of IOs executed in write-through mode per cycle.

In some embodiments, the RAID controller comprises a command dispatcher (CDU). In some embodiments, the CDU comprises hardware circuitry to store the counter. In some embodiments, the CDU comprises hardware circuitry to receive a plurality of host IO. In some embodiments, the CDU comprises hardware circuitry to perform a repeating cycle. In some embodiments, the repeating cycle comprises creating of an accelerated IO (ACIO) from each of the host IOs. In some embodiments, the repeating cycle comprises transmitting each remaining ACIO to the cache manager for execution until the counter exceeds $W_C$. In some embodiments, the repeating cycle comprises updating the counter for every ACIO transmitted to the cache manager. In some embodiments, the repeating cycle comprises transmitting each remaining ACIO to the IO manager for execution until the counter reaches $W_{tot}$. In some embodiments, the repeating cycle comprises updating the counter for every ACIO transmitted to the IO manager. In some embodiments, the repeating cycle comprises resetting the counter after transmitting $W_{tot}$ ACIOs.

In some embodiments, the CDU comprises hardware circuitry to receive a plurality of write completion confirmations from the cache manager and the IO manager. In some embodiments, the CDU comprises hardware circuitry to notify the host of each of the plurality of write completion confirmations upon receipt.

A device in accordance with another set of embodiments comprises logic to manage a virtual disk comprising a plurality of arms. In some embodiments, each of the arms comprises physical storage on a physical disk. In some embodiments, the device comprises a cache comprising random access memory (RAM). In some embodiments, the device comprises logic to establish a flexible write cache policy. In some embodiments, the device comprises logic to execute a first plurality of write input-output operations (IO) in write-back mode, based at least in part on the flexible write cache policy. In some embodiments, the device comprises logic to execute a second plurality of IOs in write-though mode, based at least in part on the flexible write cache policy.

In some embodiments, the device comprises logic to receive a plurality of IOs;

In some embodiments, the logic to execute a first plurality of write input-output operations (IO) in write-back mode comprises logic to transmit a first set of the plurality of IOs for execution in write-back mode. In some embodiments, the logic to execute a second plurality of IOs in write-though mode comprises logic to transmit a second set of the plurality of IOs for execution on the virtual disk.

In some embodiments, the device comprises logic to set a counter to implement the flexible write cache policy. In some embodiments, the device comprises logic to receive user input indicating a preferred ratio of write-back IOs to total IOs ($P_C$). In some embodiments. In some embodiments, the flexible write cache policy implements the preferred ratio ($P_C$). In some embodiments, the preferred ratio ($P_C$) of write-back IOs to total IOs is expressed as one of a limited plurality of discrete percentages or fractions. In some embodiments, the flexible write cache policy establishes a group size $W_{tot}$. In some embodiments, the device further comprises logic to configure the counter to reset after $W_{tot}$ IOs have been performed.

In some embodiments, the logic to execute a first plurality of IOs in write-back mode comprises logic to perform ($P_C \cdot W_{tot}$) IOs in write-back mode before the counter resets. In some embodiments, the logic to execute a second plurality of IOs in write-though mode comprises logic to perform (($1-P_C) \cdot W_{tot}$) IOs in write-though mode before the counter resets. In some embodiments, $W_{tot}$ is 5 and ($P_C \cdot W_{tot}$) is an integer between 0 and 5. In some embodiments, the logic to set the counter comprises logic to reset the counter at start of day (SOD).

In some embodiments, the device comprises a processor. In some embodiments, the device comprises hardware circuitry. In some embodiments, the device comprises a firmware that stores instructions executable by the processor.

In some embodiments, the logic comprises the hardware circuitry. In some embodiments, the logic to establish the flexible write cache policy comprises instructions stored in the firmware executable by the processor to establish the flexible write cache policy. In some embodiments, the hardware circuitry stores a virtual disk property table (VDPT). In some embodiments, the instructions to establish the flexible write cache policy comprise instructions executable by the processor to store the flexible write cache policy in the VDPT.

In some embodiments, the first plurality of IOs comprises a first plurality of host IOs. In some embodiments, the second plurality of IOs comprises a second plurality of host IOs. In some embodiments, the logic to execute the first plurality of IOs in write-back mode comprised hardware circuitry to create a first plurality of accelerated IOs (ACIO) from the first plurality of host IOs. In some embodiments, the logic to execute the second plurality of IOs in write-though mode comprises hardware circuitry to create a second plurality of ACIOs from the second plurality of host IOs.

In some embodiments, the device comprises hardware circuitry to receive a notification of each completed ACIO. In some embodiments, the device comprises hardware circuitry to notify the host of each completed host IO. In some embodiments, the ACIOs are parent ACIOs. In some embodiments, the device comprises hardware circuitry to create a set of two or more child ACIOs from at least one of the parent ACIOs. In some embodiments, the logic to execute the first plurality of IOs in write-back mode further comprises hardware circuitry to direct the first plurality of ACIOs to a first hardware component of the device. In some embodiments, the logic to execute the second plurality of IOs in write-though mode further comprises hardware circuitry to direct the second plurality of ACIOs to a second hardware component of the device.

In some embodiments, the logic to execute the first plurality of IOs in write-back mode comprises hardware circuitry in the first component to receive the first plurality of ACIOs. In some embodiments, the logic to execute the first plurality of IOs in write-back mode comprises hardware circuitry in the first component to write the first plurality of ACIOs to the cache. In some embodiments, the logic to execute the first plurality of IOs in write-back mode comprises hardware circuitry in the first component to transmit a completion confirmation after each of the ACIOs has been written to the cache.

In some embodiments, the logic to execute the second plurality of IOs on the virtual disk comprises hardware circuitry in the second component to receive a plurality of ACIOs. In some embodiments, the logic to execute the second plurality of IOs on the virtual disk comprises hardware circuitry in the second component to create one or more drive IOs for each of the received plurality of ACIOs. In some embodiments, the logic to execute the second plurality of IOs on the virtual disk comprises hardware circuitry in the second component to send each of the drive IOs to the virtual disk for execution. In some embodiments, the logic to execute the second plurality of IOs on the virtual disk comprises hardware circuitry in the second component to transmit a completion confirmation after the one or more drive IOs for each of the received ACIOs have been executed on the virtual disk.

In some embodiments, the hardware circuitry to direct the second plurality of ACIOs to a second hardware component of the device comprises hardware circuitry to transmit the second plurality of ACIOs to a third component. In some embodiments, the third component comprises hardware circuitry to generate one or more parity values. In some embodiments, the third component comprises hardware circuitry to write the second plurality of ACIOs and the one or more parity values to the cache. In some embodiments, the third component comprises hardware circuitry to generate a third set of ACIOs from the second plurality of ACIOs and the one or more parity values In some embodiments, the third component comprises hardware circuitry to flush the cache by directing the third set of ACIOs to the second component. In some embodiments, the plurality of ACIOs received by the second component comprises the third set of ACIOs.

Some embodiments provide methods. A method in accordance with some embodiments comprises managing a virtual disk comprising a plurality of arms, each of the arms comprising physical storage on a physical disk. In some embodiments, the method comprises. In some embodiments, the method comprises establishing a flexible write cache policy. In some embodiments, the method comprises executing a first plurality of write input-output operations (IO) on a cache, based at least in part on the flexible write cache policy. In some embodiments, the method comprises executing a second plurality of IOs in write-though mode, based at least in part on the flexible write cache policy.

Figure 10:
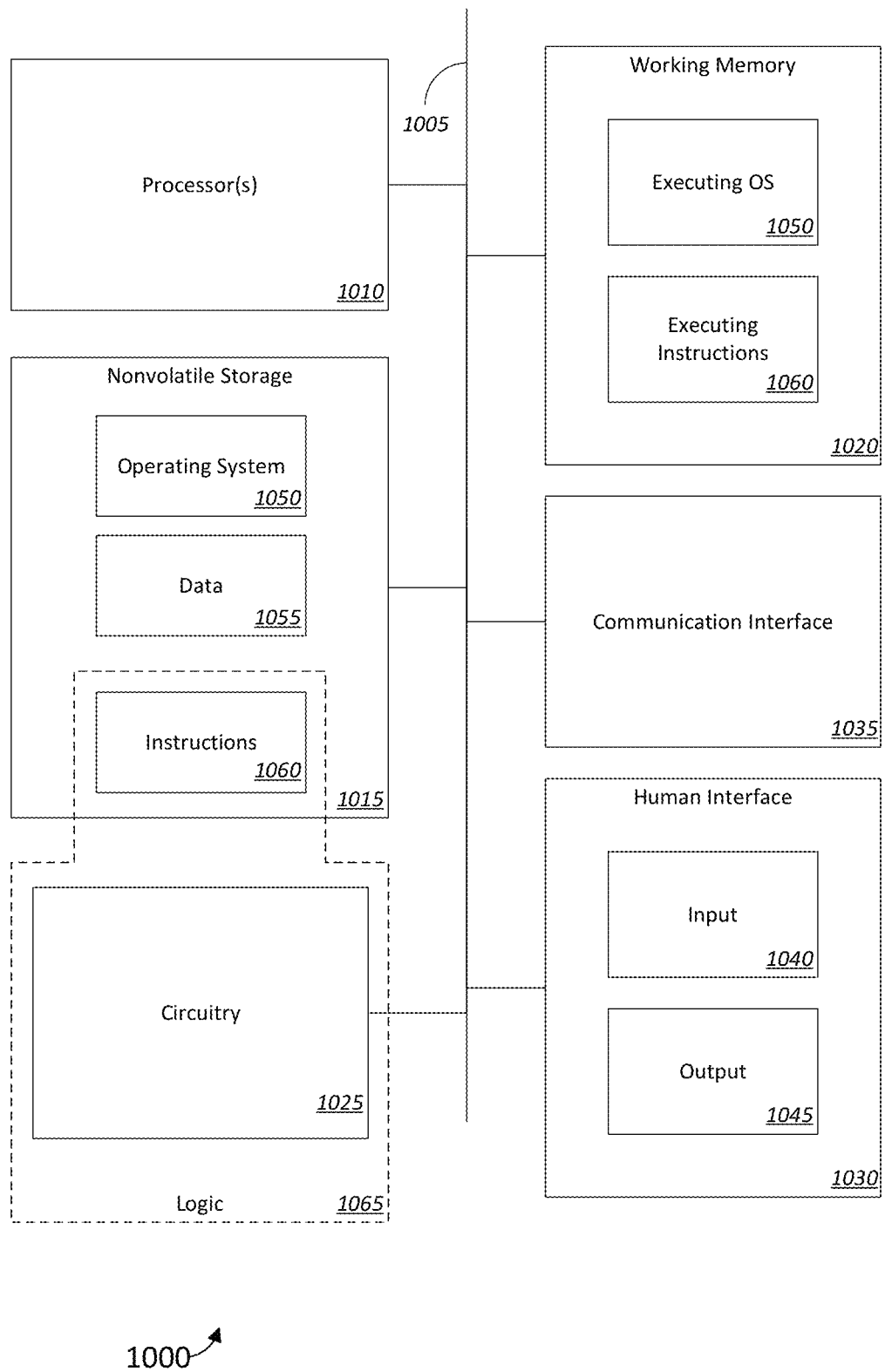
FIG. 10 is a block diagram illustrating example components of a computer system in accordance with some embodiments.

FIG. 10 is a block diagram illustrating an example of a device 1000, which can function as described herein, including without limitation serving as a device, a RAID controller, a host, a computer system, etc. (or a component of any of these) in accordance with various embodiments, and/or performing some or all operations of the methods described herein. No component shown in FIG. 10 should be considered necessary or required by each embodiment. For example, many embodiments may not include a processor and/or might be implemented entirely in hardware or firmware circuitry. Similarly, many embodiments may not include input devices, output devices, or network interfaces.

With that prelude, as shown in FIG. 10, the device 1000 may include a bus 1005. The bus 1005 can include one or more components that enable wired and/or wireless communication among the components of the device 1000. The bus 1005 may couple together two or more components of FIG. 10, such as via operative coupling, communicative coupling, electronic coupling, and/or electric coupling. Such components can include a processor 1010, nonvolatile storage 1015, working memory (e.g., system dynamic random-access memory (DRAM)) 1020, and/or circuitry 1025. In some cases, the system 1000 can include human interface components 1030 and/or a communication interface 1035.

While these components are displayed as integrated within the device 1000, certain components might be located external from the device 1000. As such, the device 1000 might include, instead of or in addition to the components themselves, facilities for communicating with such external devices, which therefore can be considered part of the device 1000 in some embodiments.

Merely by way of example, the nonvolatile storage 1015 can include a hard disk drive (HDD), a solid-state drive (SSD), and/or any other form of persistent storage (i.e., storage that does not require power to maintain the state of the stored data). While such storage often is incorporated within the device 1000 itself, such storage might be external to the device 1000 and can include external HDD, SSD, flash drives, or the like, as well as networked storage (e.g., shared storage on a file server, etc.), storage on a storage area network (SAN), cloud-based storage, and/or the like. Unless the context dictates otherwise, any such storage can be considered part of the device 1000 in accordance with various embodiments. In an aspect, the storage 1015 can be non-transitory.

Similarly, the human interface 1030 can include input components 1040 and/or output components 1045, which can be disposed within the device 1000, external to the device 1000, and/or combinations thereof. The input components 1040 can enable the device 1000 to receive input, such as user input and/or sensed input. For example, the input components 1040 may include a touch screen, a keyboard, a keypad, a mouse, a button, a microphone, a switch, a sensor, a global positioning system sensor, an accelerometer, a gyroscope, and/or an actuator. In some cases, such components can be external to the device 1000 and/or can communicate with components internal to the device 1000 such as input jacks, USB ports, Bluetooth radios, and/or the like. Similarly, the output component 1045 can enable the device 1000 to provide output, such as via a display, a printer, a speaker, and/or the like, any of which can be internal to the device 1000 and/or external to the device but in communication with internal components, such as a USB port, a Bluetooth radio, a video port, and/or the like. Again, unless the context dictates otherwise, any such components can be considered part of the device 1000 in accordance with various embodiments.

From these examples, it should be appreciated that various embodiments can support a variety of arrangements of external and/or internal components, all of which can be considered part of the device 1000. In certain embodiments, some or all of these components might be virtualized; examples can include virtual machines, containers (such as Docker containers, etc.), cloud computing environments, platform as a service (PAAS) environments, and/or the like.

In an aspect, the nonvolatile storage 1015 can be considered a non-transitory computer readable medium. In some embodiments, the nonvolatile storage 1015 can be used to store software and/or data for use by the device 1000. Such software/data can include an operating system 1050, data 1055, and/or instructions 1060. The operating system can include instructions governing the basic operation of the device 1000 and can include a variety of personal computer or server operating systems, embedded operating systems, and/or the like, depending on the nature of the device 1000. The data 1055 can include any of a variety of data used or produced by the device 1000 (and/or the operation thereof), such as media content, databases, documents, and/or the like. The instructions 1060 can include software code, such as applications, object code, assembly, binary, etc. used to program the processor 1010 to perform operations in accordance with various embodiments. In an aspect, the operating system 1050 can be considered part of the instructions 1060 in some embodiments.

The processor 1010 can include one or more of a central processing unit, a graphics processing unit, a microprocessor, a controller, a microcontroller, a digital signal processor (DSP), programmable logic (such as a field-programmable gate array (FPGA) an erasable programmable logic device (EPLD), or the like), an application-specific integrated circuit (ASIC), a system on a chip (SoC) and/or another type of processing component. The processor 1010 can be implemented in hardware, firmware, or a combination of hardware, firmware and/or software. In some implementations, the processor 1010 includes one or more processors capable of being programmed to perform one or more operations or processes described elsewhere herein.

For example, in some embodiments, the device 1000 can comprise logic 1065. Such logic can be any sort of code, instructions, circuitry, or the like that can cause the device 1000 to operate in accordance with the embodiments herein (e.g., to perform some or all of the processes and/or operations described herein). Merely by way of example, the logic 1065 can include the instructions 1060, which might be stored on the nonvolatile storage 1015 as noted above, loaded into working memory 1020, and/or executed by the processor 1010 to perform operations and methods in accordance with various embodiments. In an aspect, these instructions 1060 can be considered to be programming the processor 1010 to operate according to such embodiments. In the same way, the operating system 1050 (to the extent it is discrete from the instructions 1060) might be stored on the nonvolatile storage 1015, loaded into working memory 1020, and/or executed by a processor 1010.

Alternatively, and/or additionally, logic can include the circuitry 1025 (e.g., hardware or firmware), which can operate independently of, or collaboratively with, any processor 1010 the device 1000 might or might not have. (As noted above, in some cases, the circuitry 1050 itself can be considered a processor 1010.) The circuitry 1025 might be embodied by a chip, SoC, ASIC, programmable logic device (FPGA, EPLD, etc.), and/or the like. Thus, some or all of the logic enabling or causing the performance of some or all of the operations described herein might be encoded in hardware or firmware circuitry (e.g., circuitry 1050) and executed directly by such circuitry, rather than being software instructions 1060 loaded into working memory 1020. (In some cases, this functionality can be embodied by hardware instructions). Thus, unless the context dictates otherwise, embodiments described herein are not limited to any specific combination of hardware, firmware, and/or software.

The device 1000 can also include a communication interface 1035, which can enable the device 1000 to communicate with other devices via a wired (e.g., electrical and/or optical) connection and/or a wireless (RF) connection. For example, the communication interface 1060 may include one or more RF subsystems (such a Bluetooth subsystem, such as those described above, for example, a Wi-Fi subsystem, a 5G or cellular subsystem, etc.). Additionally or alternatively, some such systems can be implemented in combination, as discrete chips, as SoCs, and/or the like. The communication interface 1035 can further include a modem, a network interface card, and/or an antenna. In some cases, the communication interface 1030 might comprise a plurality of I/O ports, each of which can be any facility that provides communication between the device 1000 and other devices; in particular embodiments, such ports can network ports, such as Ethernet ports, fiber ports, etc. Other embodiments can include different types of I/O ports, such as serial ports, pinouts, and/or the like. Depending on the nature of the device 1000, the communication interface 1035 can include any standard or proprietary components to allow communication as described in accordance with various embodiments.

CONCLUSION

In the foregoing description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form without full detail for the sake of clarity. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Thus, the foregoing description provides illustration and description of some features and aspect of various embodiments, but it is not intended to be exhaustive or to limit the embodiments in general to the precise form disclosed. One skilled in the art will recognize that modifications may be made in light of the above disclosure or may be acquired from practice of the implementations, all of which can fall within the scope of various embodiments. For example, as noted above, the methods and processes described herein may be implemented using software components, firmware and/or hardware components (including without limitation processors, other hardware circuitry, custom integrated circuits (ICs), programmable logic, etc.), and/or any combination thereof.

Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Likewise, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with or without some features for ease of description and to illustrate aspects of those embodiments, the various components and/or features described herein with respect to a particular embodiment can be substituted, added and/or subtracted from among other described embodiments, unless the context dictates otherwise.

As used herein, the term "component" is intended to be broadly construed as hardware, firmware, software, or a combination of any of these. It will be apparent that systems and/or methods described herein may be implemented in different forms of hardware, firmware, and/or a combination of hardware and software. The actual specialized control hardware or software code used to implement these systems and/or methods does not limit any embodiments unless specifically recited in the claims below. Thus, when the operation and behavior of the systems and/or methods are described herein without reference to specific software code, one skilled in the art would understand that software and hardware can be used to implement the systems and/or methods based on the description herein.

In this disclosure, when an element is referred to herein as being "connected" or "coupled" to another element, it is to be understood that one element can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not preclude other connections, in which intervening elements may be present. Similarly, while the methods and processes described herein may be described in a particular order for ease of description, it should be understood that, unless the context dictates otherwise, intervening processes may take place before and/or after any portion of the described process, and, as noted above, described procedures may be reordered, added, and/or omitted in accordance with various embodiments.

In this application, the use of the singular includes the plural unless specifically stated otherwise, and use of the term "and" means "and/or" unless otherwise indicated. Also, as used herein, the term "or" is intended to be inclusive when used in a series and also may be used interchangeably with "and/or," unless explicitly stated otherwise (e.g., if used in combination with "either" or "only one of"). Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

Unless otherwise indicated, all numbers used herein to express quantities, dimensions, and so forth should be understood as being modified in all instances by the term "about." As used herein, the articles "a" and "an" are intended to include one or more items and may be used interchangeably with "one or more." Similarly, as used herein, the article "the" is intended to include one or more items referenced in connection with the article "the" and may be used interchangeably with "the one or more." As used herein, the term "set" is intended to include one or more items (e.g., related items, unrelated items, a combination of related and unrelated items, and/or the like), and may be used interchangeably with "one or more." Where only one item is intended, the phrase "only one" or similar language is used. As used herein, the terms "has," "have," "having," or the like are intended to be open-ended terms. Further, the phrase "based on" is intended to mean "based, at least in part, on" unless explicitly stated otherwise. In the foregoing description, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Thus, while each dependent claim listed below may directly depend on only one claim, the disclosure of various implementations includes each dependent claim in combination with every other claim in the claim set. No element, act, or instruction used herein should be construed as critical or essential unless explicitly described as such.

The invention claimed is:

1. A device, comprising
   a processor;
   hardware circuitry; and
   a firmware that stores instructions executable by the processor;
   logic to manage a virtual disk comprising a plurality of arms, each of the arms comprising physical storage on a physical disk;
   a cache comprising random access memory (RAM);
   instructions stored in the firmware that are executable by the processor to establish the flexible write cache policy;
   logic to execute a first plurality of host input-output operations (IO) in write-back mode, based at least in part on the flexible write cache policy; and
   logic to execute a second plurality of host IOs in write-though mode, based at least in part on the flexible write cache policy;
   wherein:
     the logic to execute the first plurality of host IOs in write-back mode comprises hardware circuitry to create a first plurality of parent accelerated IOs (ACIO) from the first plurality of host IOs; and
     the logic to execute the second plurality of IOs in write-though mode comprises hardware circuitry to create a second plurality of parent ACIOs from the second plurality of host IOs; and
     the device further comprises hardware circuitry to create a set of two or more child ACIOs from at least one of the parent ACIOs.

2. The device of claim 1, further comprising:
   logic to receive a plurality of host IOs;
   wherein:
     the logic to execute a first plurality of write input-output operations (IO) in write-back mode comprises:
       logic to transmit a first set of the plurality of IOs for execution in write-back mode; and
     the logic to execute a second plurality of IOs in write-though mode comprises:
       logic to transmit a second set of the plurality of IOs for execution on the virtual disk.

3. The device of claim 1, further comprising:
   logic to set a counter to implement the flexible write cache policy.

4. A device, comprising:
   logic to manage a virtual disk comprising a plurality of arms, each of the arms comprising physical storage on a physical disk;
   a cache comprising random access memory (RAM);

logic to establish a flexible write cache policy that implements a preferred ratio of write-back IOs to total IOs ($P_C$);

logic to set a counter to implement the flexible write cache policy;

logic to execute a first plurality of host input-output operations (IO) in write-back mode, based at least in part on the flexible write cache policy; and logic to execute a second plurality of host IOs in write-though mode, based at least in part on the flexible write cache policy.

5. The device of claim 4, wherein the preferred ratio ($P_C$) of write-back IOs to total IOs is expressed as one of a limited plurality of discrete percentages or fractions.

6. The device of claim 4, wherein:
the flexible write cache policy establishes a group size $W_{tot}$;
the device further comprises:
logic to configure the counter to reset after $W_{tot}$ IOs have been performed;
the logic to execute a first plurality of IOs in write-back mode comprises:
logic to perform ($P_C \cdot W_{tot}$) IOs in write-back mode before the counter resets; and
the logic to execute a second plurality of IOs in write-though mode comprises:
logic to perform ($(1-P_C) \cdot W_{tot}$) IOs in write-though mode before the counter resets.

7. The device of claim 6, wherein $W_{tot}$ is 5 and ($P_C \cdot W_{tot}$) is an integer between 0 and 5.

8. The device of claim 5, wherein the logic to set the counter comprises logic to reset the counter at start of day (SOD).

9. The device of claim 4, further comprising:
a processor;
hardware circuitry; and
a firmware that stores instructions executable by the processor, wherein:
the logic to establish the flexible write cache policy comprises:
instructions stored in the firmware executable by the processor to establish the flexible write cache policy.

10. The device of claim 9, wherein the logic comprises the hardware circuitry.

11. The device of claim 9, wherein:
the hardware circuitry stores a virtual disk property table (VDPT);
the instructions to establish the flexible write cache policy comprise:
instructions executable by the processor to store the flexible write cache policy in the VDPT.

12. The device of claim 9, wherein:
the first plurality of IOs comprises a first plurality of host IOs;
the second plurality of IOs comprises a second plurality of host IOs;
the logic to execute the first plurality of IOs in write-back mode comprises:
hardware circuitry to create a first plurality of accelerated IOs (ACIO) from the first plurality of host IOs; and
the logic to execute the second plurality of IOs in write-though mode comprises:
hardware circuitry to create a second plurality of ACIOs from the second plurality of host IOs.

13. The device of claim 12, wherein the device further comprises:

hardware circuitry to receive a notification of each completed ACIO; and
hardware circuitry to notify the host of each completed host IO.

14. The device of claim 12, wherein:
the ACIOs are parent ACIOs; and
the device further comprises:
hardware circuitry to create a set of two or more child ACIOs from at least one of the parent ACIOs.

15. The device of claim 14, wherein:
the logic to execute the first plurality of IOs in write-back mode further comprises hardware circuitry to direct the first plurality of ACIOs to a first hardware component of the device; and
the logic to execute the second plurality of IOs in write-though mode further comprises hardware circuitry to direct the second plurality of ACIOs to a second hardware component of the device.

16. The device of claim 15, wherein the logic to execute the first plurality of IOs in write-back mode further comprises:
hardware circuitry in the first component to receive the first plurality of ACIOs; and
hardware circuitry in the first component to write the first plurality of ACIOs to the cache; and
hardware circuitry in the first component to transmit a completion confirmation after each of the ACIOs has been written to the cache.

17. The device of claim 16, wherein the logic to execute the second plurality of IOs on the virtual disk comprises:
hardware circuitry in the second component to receive a plurality of ACIOs;
hardware circuitry in the second component to create one or more drive IOs for each of the received plurality of ACIOs;
hardware circuitry in the second component to send each of the drive IOs to the virtual disk for execution; and
hardware circuitry in the second component to transmit a completion confirmation after the one or more drive IOs for each of the received ACIOs have been executed on the virtual disk.

18. The device of claim 16, wherein:
the hardware circuitry to direct the second plurality of ACIOs to a second hardware component of the device comprises hardware circuitry to transmit the second plurality of ACIOs to a third component;
the third component comprises:
hardware circuitry to generate one or more parity values;
hardware circuitry to write the second plurality of ACIOs and the one or more parity values to the cache;
hardware circuitry to generate a third set of ACIOs from the second plurality of ACIOs and the one or more parity values; and
hardware circuitry to flush the cache by directing the third set of ACIOs to the second component; and
the plurality of ACIOs received by the second component comprises the third set of ACIOs.

19. A method, comprising:
managing a virtual disk comprising a plurality of arms, each of the arms comprising physical storage on a physical disk;
establishing a flexible write cache policy for a cache comprising random access memory (RAM), wherein the flexible write cache policy implements a preferred ratio of write-back IOs to total IOs ($P_C$);

setting a counter to implement the flexible write cache policy;

executing a first plurality of host input-output operations (IO) on the cache, based at least in part on the flexible write cache policy; and executing a second plurality of host IOs in write-though mode, based at least in part on the flexible write cache policy.

20. The method of claim 19, wherein executing a first plurality of write host IOs comprises:

creating a first plurality of parent accelerated IOs (ACIO) from the first plurality of host IOs; and creating a set of two or more child ACIOs from at least one of the parent ACIOs.

* * * * *